United States Patent [19]

Varshney

[11] Patent Number: 5,626,789
[45] Date of Patent: May 6, 1997

[54] FERRIMAGNETIC CORE MATERIALS FOR MEGAHERTZ FREQUENCY HIGH FLUX DENSITY TRANSFORMERS AND INDUCTORS

[75] Inventor: Usha Varshney, Radford, Va.

[73] Assignee: American Research Corp. of Virginia, Radford, Va.

[21] Appl. No.: 757,568

[22] Filed: Sep. 11, 1991

[51] Int. Cl.⁶ .................................................. C04B 35/30
[52] U.S. Cl. ........................................ 252/62.62; 252/62.56
[58] Field of Search ................................ 252/62.62, 62.56

[56] References Cited

U.S. PATENT DOCUMENTS

| | | | |
|---|---|---|---|
| 2,980,618 | 4/1961 | Guillaud et al. | 252/62.62 |
| 3,020,426 | 2/1962 | vander Burgz | 252/62.62 |
| 3,032,503 | 5/1962 | Sixtus et al. | 252/62.62 |
| 3,036,009 | 5/1962 | Zerbes | 252/62.62 |
| 3,294,687 | 12/1966 | Carlson et al. | 252/62.51 |
| 3,415,751 | 12/1968 | Hirota et al. | 252/62.59 |
| 3,509,058 | 4/1970 | Estival et al. | 252/62.62 |
| 3,514,405 | 5/1970 | Rabl | 252/62.62 |
| 3,533,949 | 10/1970 | Slick | 252/62.62 |
| 3,574,116 | 4/1971 | Sugano et al. | 252/62.59 |
| 3,609,083 | 9/1971 | Slick | 252/62.62 |
| 3,864,824 | 2/1975 | Watson et al. | 29/608 |
| 4,069,164 | 1/1978 | Dezawe et al. | 252/62.62 |
| 4,247,500 | 1/1981 | Dixon et al. | 64/63 |
| 4,719,148 | 1/1988 | Stoppels et al. | 252/62.62 |
| 4,863,625 | 9/1989 | Roelofsma et al. | 252/62.59 |

FOREIGN PATENT DOCUMENTS

| | | |
|---|---|---|
| 751623 | 7/1956 | United Kingdom . |
| 752659 | 7/1956 | United Kingdom . |
| 803625 | 10/1958 | United Kingdom . |

*Primary Examiner*—Melissa Bonner
*Attorney, Agent, or Firm*—Dickstein, Shapiro, Morin & Oshinsky LLP

[57] ABSTRACT

An improved NiZnCo ferrimagnetic core material which may further contain elements from the group Cr, Mn or Li. The invention permits enhancement of magnetic properties and results in core materials capable of efficient operation at high frequencies on the order of 1–100 MHz over a wide range of magnetic flux densities, on the order of 1–2500 Gauss. The composition of base NiZnCo ferrites are adjusted through ionic substitution. The magnetic properties of the ferrite are further enhanced through $Bi_2O_3$ and $SiO_2$ additions and controlled sintering. Methods of manufacturing the core material are also disclosed.

14 Claims, 27 Drawing Sheets

0.5 HRS.
915 — Ni(0.31)Zn(0.5)Co(0.04)Cr(0.15)Fe(2.0)O(4.0)

2 HRS.
915 — Ni(0.31)Zn(0.5)Co(0.04)Cr(0.15)Fe(2.0)O(4.0)

8 HRS.
915 — Ni(0.31)Zn(0.5)Co(0.04)Cr(0.15)Fe(2.0)O(4.0)

24 HRS.
915 — Ni(0.31)Zn(0.5)Co(0.04)Cr(0.15)Fe(2.0)O(4.0)

1050°C
915 — Ni(0.31)Zn(0.5)Co(0.04)Cr(0.15)Fe(2.0)O(4.0)

1150°C
915 — Ni(0.31)Zn(0.5)Co(0.04)Cr(0.15)Fe(2.0)O(4.0)

1250°C
915 — Ni(0.31)Zn(0.5)Co(0.04)Cr(0.15)Fe(2.0)O(4.0)

1350°C
915 — Ni(0.31)Zn(0.5)Co(0.04)Cr(0.15)Fe(2.0)O(4.0)

6000 — Ni(0.86)Zn(0.1)Co(0.04)Fe(2.0)O(4.0)

6001 — Ni(0.86)Zn(0.1)Co(0.04)Fe(2.0)O(4.0), 1.0wt% $Bi_2O_3$ + 0.5wt% $SiO_2$

7000 – Ni(0.88)Zn(0.1)Co(0.02)Fe(2.0)O(4.0)

7001 – Ni(0.88)Zn(0.1)Co(0.02)Fe(2.0)O(4.0), 1.0wt% $Bi_2O_3$ + 0.5wt% $SiO_2$

FERRIMAGNETIC CORE MATERIALS FOR MEGAHERTZ FREQUENCY HIGH FLUX DENSITY TRANSFORMERS AND INDUCTORS

FIELD OF THE INVENTION

This invention relates to improved nickel-zinc-cobalt ferrite materials, more specifically, optimum compositions of such materials for application as ferrimagnetic cores operating at high flux densities and high frequencies, on the order of 1–100 MHz.

BACKGROUND OF THE INVENTION

Recent developments in very high speed integrated circuits (VHSIC) have led to the need for high efficiency, high power density resonant mode and switched mode power supplies, operating at frequencies in excess of 1 Megahertz (MHz). At present, power supply volume exceeds that occupied by all of the electronic components in VHSIC circuitry. Standard core designs and winding constructions result in transformers and inductors which limit the miniaturization process by extending beyond the envelope of the power supply layout. Increasing the operating frequency of the power supply results in reduction in the volume occupied by magnetic components and devices. As switching frequencies are increased, magnetic core losses and electric winding losses are also increased. These developments have placed stringent requirements in ferrite chemical compositions that are capable of providing low magnetic losses at high operating frequencies and magnetic flux densities required for power supplies. Transformers and inductors operating at megahertz frequencies require ferrimagnetic core materials that exhibit low power loss, high as well as low permeability and high dispersion frequency, and adequate Curie temperature.

The power loss density is simply the total power loss of the core material divided by the volume of the core. Typically, power loss density is expressed in units of watts/$cm^3$, but may also be expressed by the dimensionless parameter known as "loss tangent."

It has long been known in the art that naturally occurring magnetite ($Fe_3O_4$) is generally suitable for high frequency applications. Significantly, $Fe_3O_4$ has a spinel microstructure. Efforts have therefore focused on developing magnetic ceramics having a similar spinel structure but with enhanced magnetic properties. As is the case with ferrimagnetic materials such as elemental iron, the magnetism of $Fe_3O_4$ is attributed to the magnetic moments of the individual ions in the unit cell lattice. For purposes of developing new magnetic materials with enhanced magnetic properties, emphasis is therefore placed upon the various species of ions and their respective location in the lattice and sub-lattice structure. Materials exhibiting the spinel structure may be represented by the formula $R^{+2}Fe_2^{+3}O_4^{-2}$.

In developing ferrimagnetic ceramic materials, practitioners have experimented with ionic substitution to replace Fe ions. For example, displacement of $Fe^{+3}$ may be accomplished through inclusion of either magnetic or non-magnetic ions, such as $Zn^{+2}$ (0 Bohr Magnetons). In general, ionic substitution of $Fe_3O_4$ may be represented by the ionic formula $RFe_2^{+3}O_4^{-2}$, where R represents various ionic states for Ni, Zn, Mn, Co or other transition metal ions. Thus, ionic substitution with $Ni^{+2}$ and $Zn^{+2}$ is designated as $Ni^{+2}_{1-x}Zn^{+2}_xFe^{+3}_2O^{-2}_4$, where x is the formula coefficient for Zn.

Nickel-zinc-cobalt ferrites have been used for transformer and inductor cores because of their relatively high permeability and low losses. For example, U.S. Pat. Nos. 3,509,058, 3,514,405, 3,533,949 and 3,609,083, which are incorporated herein by reference, each describe methods of producing NiZnCo ferrite core materials for use in high frequency applications. As demonstrated by the prior art, certain NiZnCo ferrites exhibit desirable permeability and reduced power losses at frequencies of up to 20 MHz. Although these advancements in the art are significant, there still exists a need for materials having reduced power loss density in order to improve efficiency and reduce power supply volume using transformer and inductor components operating at ultra high frequencies, in the range of 1–100 MHz, and high flux densities of 1–2500 Gauss.

The tendencies in ferrimagnetic materials for permeability to increase and power loss to decrease as operating frequencies increase have been offset in part by microstructural modification of the core material through specially developed processing techniques, which typically involve one or more high temperature sintering sequences. For example, U.S. Pat. No. 3,609,083, which is incorporated herein by reference, describes a post-sintering heat treatment utilizing rapid cooling from the sintering temperature to a temperature above the Curie temperature. The material is then rapidly quenched and thereafter annealed for a prescribed period of time. U.S. Pat. No. 3,242,089, which is incorporated herein by reference, also describes a heat treatment that incorporates post-sintering annealing. Yet another approach has been to add additional oxide materials to the base composition. For example, U.S. Pat. No. 3,574,116, which is incorporated herein by reference, describes a base composition which includes nominal amounts of $SiO_2$ and CaO.

Despite the advancements in the art, there still exists a need for optimum NiZnCo ferrite materials that are capable of extending the operating frequency range of such materials in electronic power supply applications.

SUMMARY OF THE INVENTION

This invention provides NiZnCo ferrites having improved permeability, dispersion frequency and reduced power loss density for use in transformers and inductors operating at frequencies in the range of 1 to 100 MHz and high flux densities in the range of about 1 to 2500 Gauss. The invention demonstrates the feasibility of enhancing magnetic properties of NiZnCo ferrites for high frequency applications by identifying the required types and amounts of substitution ions and monitoring fabrication parameters, including oxide additions and sintering conditions.

A first object of the present invention is to provide an optimum NiZnCo ferrite composition for purposes of introducing ionic substitutions in order to improve the magnetic properties of the resulting material for high frequency applications.

Another object of the invention is to provide a reliable formulation for optimizing the magnetic properties of chromium-containing NiZnCo ferrites for high frequency and/or high flux density applications.

Yet another object of the invention is to provide reliable formulations for optimizing the magnetic properties of manganese-containing and lithium-containing NiZnCo ferrites for high frequency and/or high flux density applications.

Further objects of the invention are to provide an optimized NiZnCo ferrite containing $Bi_2O_3$ and $SiO_2$, and to provide methods for fabricating improved NiZnCo ferrites so as to match the magnetic properties of the ferrite to a particular high frequency application.

Additional objects of this invention will become apparent in the detailed description of the invention which follows.

Accordingly, the present invention is directed to a ferrimagnetic core material for efficient application at high frequencies. The core material comprises a compound that essentially satisfies the formula $RFe_2O_4$ where R is $Ni_{1-x-y-z}Zn_xCo_yP_z$ where P is selected from the group consisting of Cr, Mn and Li. The core material is further characterized in that where R is $Ni_{1-x-y-z}Zn_xCo_yCr_z$, x is in the range of from about 0.01 to about 0.7, y is in the range of from about 0.001 to about 0.25 and z is in the range of from about 0.01 to about 0.40, preferably about 0.1 to about 0.2; where R is $Ni_{1-x-y-z}Zn_xCo_yMn_z$, x is in the range of from about 0.01 to about 0.7, y is in the range of from about 0.001 to about 0.25 and z is in the range of from about 0 to about 0.75 and where R is $Ni_{1-x-y-z}Zn_xCo_yLi_z$, x is in the range of from about 0.01 to about 0.7, y is in the range of from about 0.01 to about 0.25 and z is in the range of from about 0.01 to about 0.30.

According to particularly preferred embodiments, R is $Ni_{1-x-y-z}Zn_xCo_yP_z$, P is Cr, x is 0.5, y is 0.04 and z is 0.15; or P is Mn, x is 0.1, y is 0.04 and z is 0.1.

The invention also provides an improved core where R is $Ni_{1-x-y}Zn_xCo_y$ and $Bi_2O_3$ in about 1.0 weight percent and $SiO_2$ in about 0.5 weight percent are included as additives.

In addition, the present invention provides methods for manufacturing the improved core materials by a ceramic technique involving slow cooling and a sintering process, including particular time and temperature conditions, which depend, as will be described herein, on the particular formulation and the desired resultant magnetic properties of the material. The resulting sintered materials are particularly useful in high frequency and/or high flux density applications where power losses must be minimized.

DETAILED DESCRIPTION OF THE INVENTION

Figure 1:
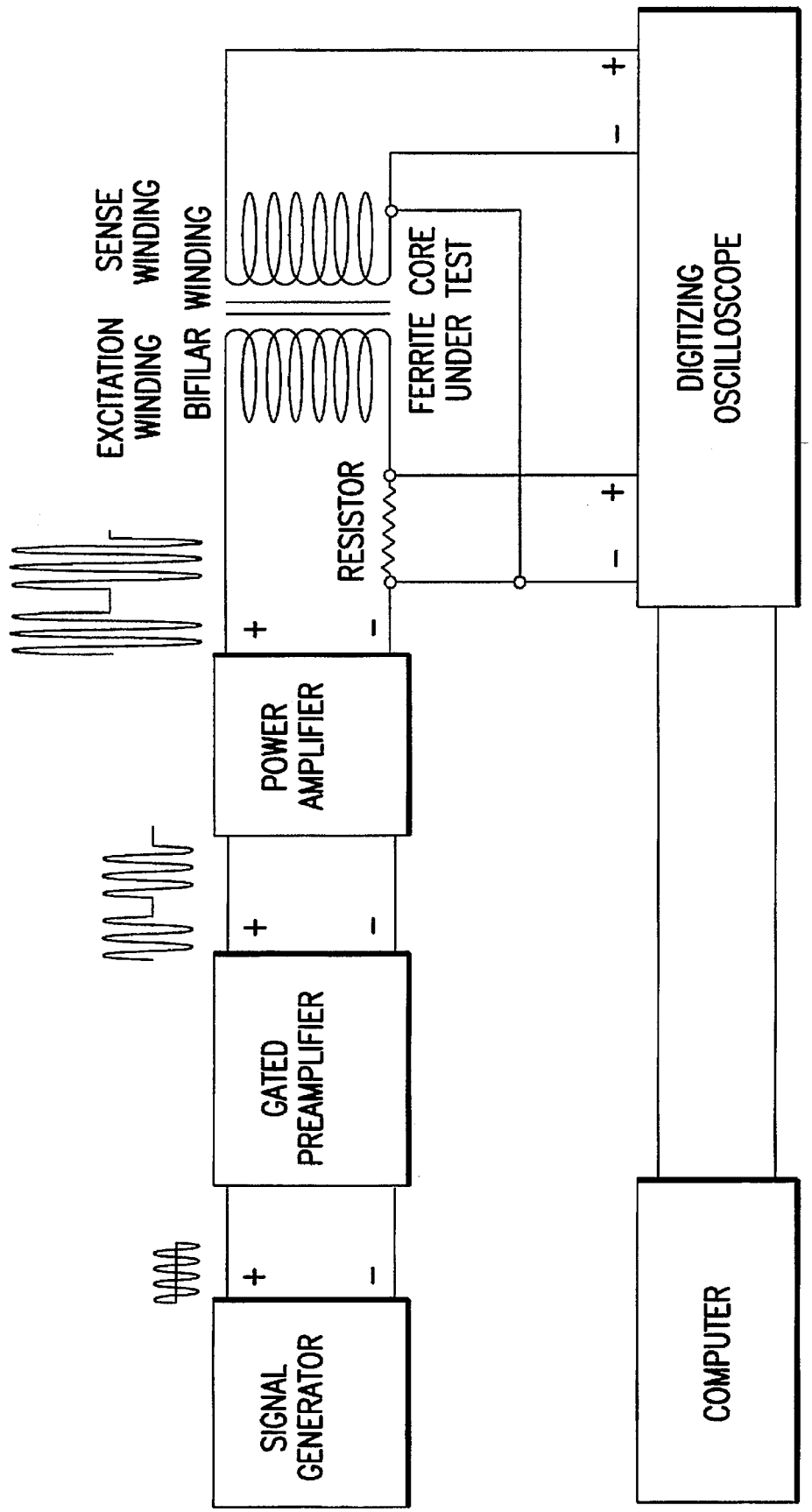
FIG. 1 is a block diagram of the circuit used to measure the excitation current and voltage in toroidal ferrite samples at high magnetic flux densities.

Reference will now be made in detail to the presently preferred embodiments of the invention, which, together with the following example, serve to explain the principles of the invention.

The present invention is based on the discovery of an optimum NiZnCo ferrite for megahertz frequency (1–100 MHz) and high flux density (1–2500 Gauss) application and upon enhancement of the magnetic properties of such ferrite through ionic substitution, oxide additions and selected sintering conditions. The resultant ferrites advantageously extend the frequency range application up to nearly 100 MHz without suffering power losses as heretofore experienced by ultra high frequency application of the prior art materials.

Based upon initial permeability, permeability, and loss tangent measurements, over a wide range of frequencies (1–100 MHz) and flux densities (1–2500 Gauss), on a series of NiZnCo ferrites of the formula $Ni_{1-x-y}Zn_xCo_yFe_2O_4$, where x is 0.1 and y ranges from 0.02 to 0.2, it is determined that the formula $Ni_{0.86}Zn_{0.1}Co_{0.04}Fe_2O_4$ is an optimum NiZnCo base ferrite for high frequency application. This particular composition was chosen for further enhancement of the magnetic properties of such ferrite under high frequency operating conditions because it exhibits an exceptionally high dispersion frequency as compared to other NiZnCo compositions. This particular NiZnCo ferrite is derived from measurements on a series of NiZn ferrite compositions of the formula $Ni_{1-x}Zn_xFe_2O_4$, where x ranges from 0.1 to 0.5, whereby it was first determined that the base NiZn ferrite of the formula $Ni_{0.9}Zn_{0.1}Fe_2O_4$ exhibits comparatively high dispersion frequency and, thus, is the best starting point for determining the optimum NiZnCo ferrite ($Ni_{0.86}Zn_{0.1}Co_{0.04}Fe_2O_4$).

Consequently, by ionic substitution of Co ions in $Ni_{0.9}Zn_{0.1}Fe_2O_4$, the base NiZnCo ferrite ($Ni_{0.86}Zn_{0.1}Co_{0.04}Fe_2O_4$) is selected not only as the optimum NiZnCo ferrite composition for high frequency applications, but also the optimum base ferrite for further enhancement of magnetic properties according to the present invention in order to further extend the operating frequency range of such materials.

As previously stated, a high dispersion frequency NiZn ferrite ($Ni_{0.9}Zn_{0.1}Fe_2O_4$) is chosen for ionic substitution of Co as a means for obtaining an optimum NiZnCo base ferrite composition for high frequency applications. Co substitution further shifts the dispersion frequency to higher values.

Initial permeability too increases as the Co ionic concentration increases up to a formula coefficient of about 0.04, beyond which initial permeability decreases. In general, the enhanced permeability demonstrated by NiZnCo ferrites is due to the replacement of $Ni^{2+}$ ions, having 2 Bohr Magnetons, with $Co^{2+}/Co^{3+}$ ions, having 3 or 4 Bohr Magnetons, at the octahedral sites. Thus, Co ions operate to increase the magnetic moment of the unit cell, which in turn increases the net magnetization of the aggregate material, as well as the corresponding initial permeability. However, once the Co formula coefficient exceeds approximately 0.04, initial permeability declines as the formula coefficient for Co increases further.

The decrease in initial permeability and loss tangent above the critical Co level of 0.04 results because $Co^{+2}$, a highly magnetically anisotropic ion, diffuses among nonequivalent octahedral sites favoring those closest to the direction of magnetization. This preferential occupation produces anisotropy along the magnetization direction. In the vicinity of a domain wall, this anisotropy serves to create a potential well at the domain wall, thereby inhibiting large excursions of the wall during low level excitation. This reduces the permeability and, more importantly, results in reducing power losses. The preferential site occupation by $Co^{+2}$ ions occurs during the cool down period immediately following sintering, i.e., when the ferrite is heated above the Curie Temperature and then slowly cooled.

Dispersion frequency, i.e., the frequency at which the subject material resonates causing the initial permeability to drop, increases with increasing Co concentration, i.e., increasing formula coefficient. Material compositions having cobalt formula coefficients in excess of 0.08 exhibit dispersion frequencies in excess of 40 MHz. For example, $Ni_{0.70}Zn_{0.10}Co_{0.25}Fe_2O_4$ (1200° C., 4 hours, $O_2$ atmosphere) exhibits an initial permeability value of approximately 3.6 and a dispersion frequency in excess of 100 MHz. This initial permeability is about twice that of an air core, and remains magnetically stable throughout the entire frequency range of 1–100 MHz.

A substituted ferrite of the formula $Ni_{0.86}Zn_{0.1}Co_{0.04}Fe_2O_4$ (1200° C., 4 hours, $O_2$ atmosphere) exhibits permeability in the range of about 40 to about 120 at flux densities up to 2500 Gauss. The loss tangent for the same composition varies from about 0.4 to about 0.7 for the same range of flux density. Ferrites exhibiting higher permeability values also display lower values of loss tangent, which in turn corresponds to lower power loss density. As discussed earlier, a formula coefficient for Co in excess of about 0.04 yields progressively lower values for initial permeability and variable values of loss tangent as a function of frequency.

Accordingly, in a first embodiment of the present invention, a composition for NiZnCo ferrites exhibiting enhanced magnetic properties for material applications operating at high frequencies up to 100 MHz, over a broad range of flux densities on the order of about 80–2500 Gauss, is selected from the formula $Ni_{1-x-y}Zn_xCo_yFe_2O_4$ where the formula coefficient x for Zn is in the range of about 0.01–0.70; the formula coefficient y for Co is in the range of about 0.001 to 0.25, and the formula coefficient for Ni is 1-x-y. It is understood that the selection of a particular NiZnCo ferrite will, of course, depend on the intended application and the environment in which the ferrite material will be operating.

In particular, where x is 0.1 and y is 0.04 (sintered at a temperature of 1150° C. in oxygen atmsphere for 4 hours and cooled at a rate of 100° C. per hour) a low permeability ferrite is fabricated having a permeability of 18 and a power loss density of 6.5 Watts/$cm^3$ at an excitation frequency of 2 MHz and a flux density of 200 Gauss.

The present invention is also directed to ionic substitution of Cr, Mn or Li ions in the optimum base NiZnCo ferrite and measurement of loss tangent and permeability at a broad range of frequencies and flux densities for compositions of the formula $Ni_{1-x-y-z}Zn_xCo_yP_zFe_2O_4$ where P is either Cr, Mn or Li. Where P is Cr and x ranges from 0.1 to 0.5, y ranges from 0.04 to 0.1 and z ranges from 0.01 to 0.4, surprisingly, it is found that the substitution of Cr dramatically shifts the dispersion frequency of the base NiZnCo ferrite to still higher values. Where P is Mn and x ranges from 0.1 to 0.5, y is 0.04 and z ranges from 0.03 to 0.5, it is found that the optimum composition is $Ni_{0.76}Zn_{0.1}Co_{0.04}Mn_{0.1}Fe_2O_4$, resulting in a ferrite capable of operating in a broad range of flux density (200–1250 Gauss) with virtually no variation in permeability (56) or loss tangent (0.65). Finally, where P is Li and x ranges from 0.1 to 0.5, y is 0.04 and z ranges from 0.01 to 0.3 it is found that permeability increases with the increase of Li concentration. Each of these ferrites according to the invention exhibits certain optimum properties for high frequency application and will be discussed below with further reference to their methods of manufacture and uses.

In order to realize the enhanced magnetic properties of the ferrites of the invention, the sintering process in the preparation of the ferrite must be accurately controlled. The invention therefore also relates to a method of manufacturing a ferrimagnetic core constructed from NiZnCo and Cr, Mn or Li containing NiZnCo ferrites. This method is characterized, in part, by a ceramic technique, involving slow cooling (100° C./hour) and sintering for periods of between 0.5 –24 hours at temperatures between 1050° and 1350° C. in either air, $N_2$ or $O_2$ atmospheres.

In general, the methods of preparation of materials for final firing to produce a ferrite are well known in the art. For example, U.S. Pat. Nos 4,247,500 and 3,533,949 describe such methods. These two U.S. Patents are incorporated herein by reference in their entirety. In addition, the example hereinbelow sets forth a preferred embodiment for preparation, which may be varied in practice without departing from the scope of the invention, as disclosed in the accompanying description and appended claims.

With particular reference to ionic substitution of Cr in the base NiZnCo ferrite according to the invention, permeability and loss tangent are highly sensitive to sintering time. For the same composition fired at 1250° C., higher losses occur with increasing sintering times. Further, the same composition fired at various temperatures for 4 hours under similar firing conditions results in a range of magnetic properties. In general, higher initial permeability and loss tangent values correspond to increasing sintering temperatures.

In particular, Cr ionic substitution to produce a ferrite of the formula $Ni_{0.31}Zn_{0.5}Co_{0.04}Cr_{0.15}Fe_2O_4$ sintered at either 1250° C. for 0.5 hour or 1150° C. for 4 hours results in optimum substituted ferrite materials for high frequency application. Such materials exhibit permeability values 40% and 60% higher, respectively, and power loss density values 10% and 35% lower, respectively, than commercially available 4C4 ferroxcube. However, when either the formula coefficients or sintering conditions are changed, a somewhat less than optimal high frequency ferrite is produced.

The Cr formula coefficient should be in the range of from about 0.01 to 0.40. Preferably, the formula coefficient for Cr is about 0.15. The formula coefficient for Co is preferably in the range of from 0.001 to 0.25 and the formula coefficient for Zn is in the range of from 0.01 to 0.7. Outside these ranges, the permeability and power loss density characteristics crucial to high frequency application suffer.

It is noted that Cr substitution, at fixed Zn formula coefficient, extends the dispersion frequency. For example, $Ni_{0.66}Zn_{0.3}Co_{0.04}Fe_2O_4$ has a dispersion frequency of about 23 MHz, whereas $Ni_{0.65}Zn_{0.3}Co_{0.04}Cr_{0.01}Fe_2O_4$ has a dispersion frequency of approximately 30 MHz. Moreover, substituted NiZnCo ferrites exhibit initial permeability of about 35–40, well above that of the base NiZn ferrite ($Ni_{0.9}Zn_{0.1}Fe_2O_4$), which has an initial permeability of about 5.

Ferrites having a Zn formula coefficient of 0.1 also exhibit increasing dispersion frequencies relative to other Zn compositions, with increasing Cr formula coefficient. For example, $Ni_{0.86}Zn_{0.1}Co_{0.04}Fe_2O_4$ exhibits a dispersion frequency of 40 MHz, while $Ni_{0.81}Zn_{0.1}Co_{0.04}Cr_{0.05}Fe_2O_4$ has a dispersion frequency of approximately 60 MHz. The initial permeability for these substituted ferrites, which varies from about 11 to 15, is also greater than the initial permeability of the base ferrite ($Ni_{0.90}Zn_{0.1}Fe_2O_4$). Moreover, the addition of Cr also dramatically improves the dispersion frequency of otherwise unsubstituted NiZnCo ferrites. For example, $Ni_{0.81}Zn_{0.1}Co_{0.04}Cr_{0.05}Fe_2O_4$ has a dispersion frequency of about 50–60 MHz, whereas the base NiZnCo ferrite ($Ni_{0.86}Zn_{0.1}Co_{0.04}Fe_2O_4$) has a lower dispersion frequency on the order of 20–23 MHz.

Furthermore, as the amount of Cr substitution increases between 0 and 0.4 at a Zn formula coefficient of 0.5, the initial permeability decreases, but the dispersion frequency increases. Thus, it is possible for the practitioner to balance the need for high initial permeability with the need for high dispersion frequency. As a result, it is possible to select the appropriate level of Cr substitution in order to obtain the desired values for initial permeability and dispersion frequency. In those instances where dispersion frequency is not critical, one: can obtain very high initial permeability on the order of 100 by simply adding a small amount of Cr. For example, $Ni_{0.41}Zn_{0.5}Co_{0.04}Cr_{0.05}Fe_2O_4$ has an initial permeability of about 100 and a dispersion frequency of about 10 MHz. However, where initial permeability is not that critical but dispersion frequency is, a composition such as $Ni_{0.06}Zn_{0.5}Co_{0.04}Cr_{0.4}Fe_2O_4$, which has a dispersion frequency in excess of 100 MHz and a stable initial permeability of about 2, would be more appropriate. Thus, with respect to NiZnCo ferrites, for a given formula coefficient of Zn and Co, the practitioner may selectively balance the need for high permeability against the need for higher dispersion frequencies by adjusting the formula coefficient for Cr according to the teachings herein.

The effect of Cr substitution is similar with respect to the loss factor. Specifically, for a given concentration of Zn and, Co, Cr substitution effectively lowers the loss factor across the entire range of operating frequencies up to the dispersion frequency.

Initial permeability and loss factor decrease with increasing Cr ionic substitutions. The decrease in initial permeability with increase in $Cr^{+3}$ occurs because $Cr^{+3}$ has a magnetic moment of 3 Bohr-Magnetons and a strong preference for octahedral sites, sufficient to displace $Ni^{+2}$ ions. However, Jahn-Teller crystal-field distortions cause $Cr^{+3}$ to assume a magnetic moment of one Bohr-Magneton due to spin quenching. Therefore, $Ni^{+2}$ ions of two Bohr-Magnetons are replaced by $Cr^{+3}$ of one Bohr-Magneton resulting in a net decrease in permeability. The decrease in loss factor with the increase of $Cr^{+3}$ ions is due to the domain wall stabilization as a result of the $Cr^{+3}$ anisotropy contribution at the octahedral site. The dispersion frequency increases as a function of increasing Cr ionic substitutions for each sintering sequence.

Thus, permeability decreases as a function of increased Cr substitutions as compared to unsubstituted NiZnCo ferrites. Loss factor decreases with Cr substitution as compared to unaltered NiZnCo ferrite compositions. Cr additions also have the further advantage of improving the temperature coefficient of permeability for NiZnCo ferrite materials. Substitution with Cr thus presents the opportunity for obtaining either a positive or negative temperature coefficient within a given range of temperatures.

As was stated earlier, the sintering parameters play an important role in determining the magnetic properties of the Cr ion substituted ferrites. Perhaps the most important sintering parameters are sintering temperature, sintering environment, sintering time, and cooling rate. For a single ferrite composition (for example, $Ni_{0.31}Zn_{0.5}Co_{0.04}Cr_{0.15}Fe_2O_4$) sintered at 1250° C. for various sintering times, initial permeability increases as sintering time increases. Sintering times in excess of 2 hours result in values for initial permeability of between about 70 and 100, and corresponding dispersion frequencies between 10 and 20 MHz. Similarly, longer sintering times result in increasing loss tangent up to the dispersion frequency. In general, longer sintering time also results in increasing values for permeability. When sintered for a period of one-half hour, the initial permeability is approximately 260 with a dispersion frequency of slightly less than 10 MHz.

Accordingly, with respect to NiZnCoCr ferrites, in a first preferred embodiment, a composition for NiZnCoCr ferrite, exhibiting enhanced magnetic properties for material applications operating at high frequencies up to 100 MHz over a broad range of flux densities on the order of about 1 to 2500 Geluss, is selected from the formula $Ni_{1-x-y-z}Zn_xCo_yCr_zFe_2O_4$ where the formula coefficient x for Zn is in the range of about 0.01–0.7; the formula coefficient y for Co is in the range of about 0.01–0.25; the formula coefficient z for Cr is in the range of about 0.01–0.40; and the formula coefficient for Ni is 1-x-y-z. It is understood that the selection of a particular NiZnCoCr ferrite will, of course, depend on the intended application and the environment in which the ferrite material will be operating.

In particular, for x=0.5, y=0.04 and z=0.15, when sintered at a temperature of 1250° C. for 30 minutes in $O_2$ and cooled at a rate of 100° C. per hour, a ferrite may be produced with a permeability of 486 and a power loss density of 0.7 Watts/cm$^3$ at an excitation frequency of 2 MHz and a flux density 200 Gauss. When the same composition is sintered at a temperature of 1150° C. for 4 hours, one may produce a ferrite with a permeability of 392 and a power loss density of 0.6 Watts/cm$^3$ at an excitation frequency of 2 MHz and a flux density of 200 Gauss.

Furthermore, it is now evident that Cr ionic substitution of NiZnCo ferrites advantageously reduces the slope of the loss tangent versus flux density curve and shifts the values of dispersion frequency to even higher frequencies. Such substitution has a pronounced effect in reducing losses.

Now, with reference to the Mn substituted NiZnCo ferrites, the formula coefficient for Mn should be within the range of up to 0.2 and, preferably, about 0.1, for high frequency application. Such substitution results in increased permeability and reduced loss tangent at high flux density. Mn substitution is also sensitive to sintering conditions.

Initial permeability and loss factor increase with increased Mn substitution when sintered at 1275° C. for 4 hours in $N_2$ environment. The increased initial permeability is attributed to the replacement of $Ni^{+2}$ ions having 2 Bohr-Magnetons with $Mn^{+2}$ ions having 5 Bohr-Magnetons. Permeability increases and loss tangent decreases as a function of increasing Mn substitution at constant Zn formula coefficient. Various NiZnCoMn ferrites and their corresponding properties are provided by the example hereinbelow.

For a given material application, optimization of the magnetic properties of NiZnCoMn ferrites according to the present invention results in improved permeability and reduced loss factor by selectively adjusting the degree of ionic substitution of the resulting ferrite. Thus in another embodiment of the present invention, a composition for material applications operating at high frequencies up to 100 MHz over a broad range of flux densities on the order of about 1–2500 Gauss, is selected from the formula $Ni_{1-x-y-z}Zn_xCo_yMn_zFe_2O_4$ where the formula coefficient x for Zn is in the range of about 0.01 to about 0.7; the formula coefficient y for Co is in the range of about 0.001 to about 0.25; the formula coefficient z for Mn is in the range of about 0.001 to about 0.2; and the formula coefficient for Ni is 1-x-y-z. It is understood that the selection of a particular NiZnCoMn ferrite will, of course, depend on the intended application and the environment in which the ferrite material will be operating.

In particular, Mn substitution resulting in a product of the formula $Ni_{0.76}Zn_{0.1}Co_{0.04}Mn_{0.1}Fe_2O_4$ sintered at 1275° C for 4 hours in an $N_2$ atmosphere surprisingly results in an optimum NiZnCo ferrite for high frequency application, which ferrite product shows virtually no variation in permeability (56) or loss tangent (0.65) as a function of flux density from 200 to 1500 Gauss. Accordingly, the latter ferrite product is particularly well suited for power conversion inductors and high frequency transformers.

In the; substitution of Li ions in NiZnCo ferrites, the amount of Li substitution is critical—loss tangent was observed to be sensitive to Li concentration as a function of flux density. Li, however, increases initial permeability and, in formula coefficients of from 0.01 to 0.3, reduces power loss density. Increasing the Zn concentration relative to Co increases permeability for such low loss Li substituted ferrites. Various NiZnCoLi ferrites and their corresponding properties are provided by the example hereinbelow.

According to yet another embodiment of the present invention, a NiZnCoLi ferrite composition exhibiting enhanced magnetic properties for material applications operating at high frequencies up to 100 MHz over a broad range of flux densities on the order of about 1–2500 Gauss is selected from the formula $Ni_{1-x-y-z}Zn_xCo_yLi_zFe_2O_4$ where the formula coefficient x for Zn is in the range of about 0.01 to about 0.7; the formula coefficient y for Co is in the range of about 0.01 to 0.25; the formula coefficient z for Li is in the range of about 0.01 to 0.3; and the formula coefficient for Ni is 1-x-y-z. A lithium-substituted ferrite of the formula $Ni_{1-x-y-z}Zn_xCo_yLi_zFe_2O_4$ is obtained with a high permeability and reduced power loss density where x is from about 0.3 to about 0.7, y is from about 0.01 to about 0.04 and z is from about 0.0 to about 0.3. A ferrite of low permeability is obtained where x is from about 0.01 to about 0.3, y is from about 0.01 to about 0.25 and z is from about 0.01 to about 0.3. Selection of a particular NiZnCoLi ferrite depends upon the intended application and the environment in which the ferrite material will be operating.

For NiZnCo ferrites containing, in weight percent., 1% $Bi_2O_3$ and 0.5% $SiO_2$, initial permeability increases with the addition of $Bi_2O_3$ and $SiO_2$. The improved permeability results from enhanced liquid phase sintering attributed to the presence of $Bi_2O_3$ and $SiO_2$. These materials exhibit larger grain size as compared to unaltered NiZnCo ferrites having the same formula coefficients.

With respect to variation of permeability and loss factor as a function of flux density for NiZnCo ferrite containing $Bi_2O_3$ and $SiO_2$ additions, permeability increases whereas loss factor decreases for materials containing $Bi_2O_3$ and $SiO_2$. Additions of these oxides effectively increase permeability without increasing loss factor for flux densities in the range of 50–2500 Gauss.

Accordingly, in yet another embodiment of the present invention, a NiZnCo ferrite composition, exhibiting enhanced magnetic properties for material applications operating at high frequencies up to 100 MHz over a broad range of flux densities on the order of about 1 to 2500 Gauss, is selected from the formula $Ni_{1-x-y}Zn_xCo_yFe_2O_4$ containing, in weight percent, from about 0.1 to about 10% $Bi_2O_3$ and 0.1 to about 5% $SiO_2$, Where the formula coefficient x for Zn is in the range of about 0.01 to about 0.7; the formula coefficient y for Co is in the range of about 0.001 to 0.25, and the formula coefficient for Ni is 1-x-y.

Bismuth oxide and silicon oxide additions to nickel-zinc-cobalt ferrites of the formula $Ni_{1-x-y}Zn_xCo_yFe_2O_4$ are obtained with high permeability and reduced power losses where x is in the range from about 0.03 to about 0.7 and y is in the range from about 0.001 to about 0.4. Similarly, an improved ferrite is obtained having low losses and low permeability where x is in the range from about 0.01 to about 0.3 and y is in the range from about 0.04 to about 0.25. For example, for x=0.1, y=0.04, 1.0 weight percent bismuth oxide and 0.5 weight percent silicon oxide sintered at 1150° C. in oxygen for 4 hours and cooled at 100° C. per hour an improved ferrite is obtained with a permeability of 24 and a power loss density of 4.25 Watts/cm$^3$ at 2 MHz in a flux density of 200 Gauss. It is now evident that $Bi_2O_3$ and $SiO_2$ additions to NiZnCo ferrites are particularly advantageous at high flux density.

EXAMPLE

The data presented in FIGS. 2–24 were obtained by substituting one or more ions of Co, Cr, Mn or Li in the preferred base NiZn ferrite and, thereafter, measuring the magnetic properties of the resultant ferrite over a wide range of operating frequencies arid magnetic flux densities; testing was also conducted on NiZnCo ferrites containing $SiO_2$ and $Bi_2O_3$ additions. The raw data generated from these tests yielded values for power loss density, initial permeability, permeability and loss tangent. Set forth below are the methods employed for preparation of the substituted NiZn and NiZnCo ferrites, the techniques utilized to generate the raw data, and the mathematical analyses required to evaluate the data.

Ferrite Preparation

Polycrystalline solid solutions of ferrite materials were prepared using conventional ceramic techniques involving slow cooling. The desired quantity of analytical grade NiO, ZnO, $Fe_2O_3$, $CoCO_3$, $Cr_2O_3$, $MnCO_3$, and/or Li20 were wet blended with acetone, using an alumina mortar and pestle. The mixed powder was preformed into pellets of 2.27 cm diameter and 1.27 cm thickness under a pressure of 340 kg/cm$^2$. The pellets were calcined in alumina boats for a period of four hours at 900° C. in either air, $O_2$ or $N_2$ atmospheres as shown in Tables I through V below.

After calcining, the pellets were pulverized with acetone and granulated through sieves of 60–120 mesh (BSS) (300μ–125μ) using 1% by weight polyvinyl alcohol as a binder. These granules were compressed under a pressure of 1050 kg/cm$^2$ to form toroids of 2.50 cm outer diameter, 1.20 cm inner diameter and 0.50 cm thickness. These toroids were sintered in alumina combustion boats for periods of 0.5–24 hours, at temperatures between 1050° C. and 1350° C. (see Tables I through V) under the above mentioned sintering atmospheres as shown in the Tables. After sintering, samples were slowly cooled to room temperature at a rate of 100° C./hr. After cooling, the flat surfaces of the toroids were rubbed with abrasive powder and polished. In some instances (see Table V), $Bi_2O_3$ and $SiO_2$ additions were made during the final pulverization of the calcined powder.

Using the above process, Cr, Mn and Li substituted NiZnCo ferrites were prepared as shown in the Tables and discussion below. However, Cu, V, Zr and Nb ions may also be introduced without departing from the scope or intent of the present invention.

Tables I–V summarize material composition, sintering parameters, and resulting material properties for ferrites of NiZnCo, NiZnCoCr, NiZnCoMn and NiZnCoLi, and NiZnCo containing $Bi_2O_3$ and $SiO_2$, according to the present invention. As can be seen from the tables and the following discussion, in some instances different sintering conditions were applied to different samples so as to further enhance the magnetic properties of the resulting ferrites for particular applications.

TABLE I

MATERIAL COMPOSITIONS, FABRICATION PARAMETERS, DENSITY AND CURIE TEMPERATURES OF NiZn AND NiZnCo FERRITES

Sintering Time 4 hrs
Cooling Rate 100° C./hr
Sintering Temperature 1200° C.
Sintering Atmosphere Oxygen, Flow Rate 115 ml/min

| Sample Number | Compositions (Formula Coefficient) | | | | | Bulk Density (gm/cm3) | Curie Temperature (°C.) |
|---|---|---|---|---|---|---|---|
| | Ni | Zn | Co | Fe | O | | |
| 32 | 0.88 | 0.1 | 0.02 | 2 | 4 | 4.06 | 543 |
| 33 | 0.87 | 0.1 | 0.03 | 2 | 4 | 4.10 | 537 |
| 34 | 0.86 | 0.1 | 0.04 | 2 | 4 | 4.12 | 527 |
| 38 | 0.82 | 0.1 | 0.08 | 2 | 4 | 4.12 | 539 |
| 42 | 0.78 | 0.1 | 0.12 | 2 | 4 | 4.18 | 530 |
| 50 | 0.7 | 0.1 | 0.20 | 2 | 4 | 4.18 | 500 |

TABLE II

MATERIAL COMPOSITIONS, FABRICATION PARAMETERS, DENSITY AND CURIE TEMPERATURES OF NiZnCo AND NiZnCoCr FERRITES

Sintering Time 4 hrs
Cooling Rate 100° C./hr
Sintering Temperature 1250° C.
Sintering Atmosphere Oxygen, Flow Rate: 115 ml/min

| Sample Number | Chromium Substitutions (Formula Coefficient) | | | | | | Bulk Density (gm/cm3) | Curie Temperature (°C.) |
|---|---|---|---|---|---|---|---|---|
| | Ni | Zn | Co | Cr | Fe | O | | |
| 300* | 0.86 | 0.1 | 0.04 | 0 | 2 | 4 | 4.46 | — |
| 301* | 0.85 | 0.1 | 0.04 | 0.01 | 2 | 4 | 4.42 | — |
| 305* | 0.81 | 0.1 | 0.04 | 0.05 | 2 | 4 | 4.31 | — |
| 800 | 0.66 | 0.3 | 0.04 | 0 | 2 | 4 | 4.24 | — |
| 801 | 0.65 | 0.3 | 0.04 | 0.01 | 2 | 4 | 4.23 | — |
| 900 | 0.46 | 0.5 | 0.04 | 0 | 2 | 4 | 4.82 | 304 |
| 905 | 0.41 | 0.5 | 0.04 | 0.05 | 2 | 4 | 4.65 | 320 |
| 910 | 0.36 | 0.5 | 0.04 | 0.10 | 2 | 4 | 4.62 | 305 |
| 915 | 0.31 | 0.5 | 0.04 | 0.15 | 2 | 4 | 4.45 | 298 |

TABLE II-continued

MATERIAL COMPOSITIONS, FABRICATION PARAMETERS, DENSITY AND CURIE TEMPERATURES OF NiZnCo AND NiZnCoCr FERRITES

| 930 | 0.16 | 0.5 | 0.04 | 0.30 | 2 | 4 | 4.30 | 300 |
| 940 | 0.06 | 0.5 | 0.04 | 0.40 | 2 | 4 | 4.22 | — |
| 4000* | 0.8 | 0.1 | 0.1 | 0 | 2 | 4 | 4.67 | — |
| 4030* | 0.5 | 0.1 | 0.1 | 0.3 | 2 | 4 | 4.01 | — |

For samples 300, 301, 305, 4000 and 4030, the sintering temperature was 1200° C., as opposed to 1250° C. for the remaining samples listed, on Table II.

For samples 700X and 300X of Table III below, the sintering temperature was 1300° C. and the sintering time 16 hours, as opposed to 1275° C. and 4 hours as for the remaining samples of Table III.

TABLE III

MATERIAL COMPOSITIONS, FABRICATION PARAMETERS, DENSITY AND CURIE TEMPERATURES OF NiZnCo AND NiZnCoMn FERRITES

Sintering Time 4 hrs
Cooling Rate 100° C./hr
Sintering Temperature 1275° C.
Sintering Atmosphere Nitrogen, Flow Rate 260 ml/min

| Sample Number | Manganese Substitution (Formula Coefficient) | | | | | | Bulk Density (gm/cm3) | Curie Temperature (°C.) |
|---|---|---|---|---|---|---|---|---|
| | Ni | Zn | Co | Mn | Fe | O | | |
| 700X* | 0.86 | 0.1 | 0.04 | 0 | 2 | 4 | 4.47 | — |
| 703X* | 0.83 | 0.1 | 0.04 | 0.03 | 2 | 4 | 4.53 | — |
| 2000 | 0.86 | 0.1 | 0.04 | 0 | 2 | 4 | 4.86 | 501 |
| 2010 | 0.76 | 0.1 | 0.04 | 0.1 | 2 | 4 | 4.58 | 440 |
| 2050 | 0.36 | 0.1 | 0.04 | 0.5 | 2 | 4 | 4.59 | — |
| 2300 | 0.66 | 0.3 | 0.04 | 0 | 2 | 4 | 4.59 | 406 |
| 2310 | 0.56 | 0.3 | 0.04 | 0.1 | 2 | 4 | 4.60 | 342 |
| 2500 | 0.46 | 0.5 | 0.04 | 0 | 2 | 4 | 4.55 | 310 |
| 2510 | 0.36 | 0.5 | 0.04 | 0.1 | 2 | 4 | 4.56 | 265 |
| 2530 | 0.16 | 0.5 | 0.04 | 0.3 | 2 | 4 | 4.58 | 231 |

TABLE IV

MATERIAL COMPOSITIONS, FABRICATION PARAMETERS, DENSITY AND CURIE TEMPERATURES OF NiZnCo AND NiZnCoLi FERRITES

Sintering Time 4 hrs
Cooling Rate 100° C./hr
Sintering Temperature 1250° C.
Sintering Atmosphere Oxygen, Flow Rate 115 ml/min

| Sample Number | Lithium Substitution (Formula Coefficient) | | | | | | Bulk Density (gm/cm3) | Curie Temperature (°C.) |
|---|---|---|---|---|---|---|---|---|
| | Ni | Zn | Co | Li | Fe | O | | |
| 5000 | 0.86 | 0.1 | 0.04 | 0 | 2 | 4 | 4.01 | 533 |
| 5001 | 0.85 | 0.1 | 0.04 | 0.01 | 2 | 4 | 4.73 | 501 |
| 5005 | 0.81 | 0.1 | 0.04 | 0.05 | 2 | 4 | 4.75 | 504 |
| 5030 | 0.56 | 0.1 | 0.04 | 0.3 | 2 | 4 | 4.85 | 530 |
| 5100 | 0.66 | 0.3 | 0.04 | 0 | 2 | 4 | 4.88 | 427 |
| 5110 | 0.56 | 0.3 | 0.04 | 0.1 | 2 | 4 | 5.08 | 467 |
| 5200 | 0.46 | 0.5 | 0.04 | 0 | 2 | 4 | 4.81 | 292 |
| 4210 | 0.36 | 0.5 | 0.04 | 0.1 | 2 | 4 | 4.88 | 301 |

TABLE V

MATERIAL COMPOSITIONS, FABRICATION PARAMETERS, DENSITY AND CURIE TEMPERATURES OF NiZnCo FERRITES WITH Bi2O3 + SiO2 ADDITIONS

Sintering Time 4 hrs
Cooling Rate 100° C./hr
Sintering Temperature 1150° C.
Sintering Atmosphere Oxygen, Flow Rate 115 ml/min

| Sample Number | $Bi_2O_3 + SiO_3$ (Formula Coefficient) | | | | | Bulk Density (gm/cm3) | Curie Temperature (°C.) |
|---|---|---|---|---|---|---|---|
| | Ni | Zn | Co | Fe | O | | |
| 6000 | 0.86 | 0.1 | 0.04 | 2 | 4 | 4.10 | 542 |
| 6001 | 0.86 | 0.1 | 0.04 | 2 | 4 | 4.60 | 510 |
| | 1.0 wt % $Bi_2O_3$ + 0.5 wt % $SiO_2$ | | | | | | |
| 7000 | 0.88 | 0.1 | 0.02 | 2 | 4 | 4.13 | 530 |
| 7001 | 0.88 | 0.1 | 0.02 | 2 | 4 | 4.70 | 512 |
| | 1.0 wt % $Bi_2O_3$ + 0.5 wt % $SiO_2$ | | | | | | |

It is understood that other processes, sintering conditions or different materials may be substituted for the above discussed preparation procedures without departing from the intent or scope of the present invention.

Measurement of Magnetic Properties

The data presented in the accompanying figures were generated by testing each sample at a fixed flux density (1 Gauss) over a wide range of frequencies (1–100 MHz), and again at a fixed frequency (1 MHz) over a wide range of flux densities (80–2500 Gauss).

Initial permeability and loss factor measurements were obtained using a Hewlett-Packard HP 4194A impedance analyzer in conjunction with a Hewlett-Packard 4194-1B HP probe. Tests performed at a fixed, low flux density level, on the order of 1 Gauss were made over a frequency range of 1–100 MHz at room temperature (25° C.) by winding 20 turns of 30 SWG enameled copper wire around the toroidal ferrite sample. Measurements at high flux density up to 2500 Gauss were made using the experimental arrangement shown in FIG. 1 using a 20 turn bifilar winding of 30 SWG enameled copper wire at a fixed frequency of 1 MHz. The bifilar winding consisted of an excitation winding and a sense winding. For high flux density measurement, a special circuit was used to measure the excitation voltage and current in the toroidal sample. The circuit utilized a signal generator which produced a 1 MHz continuous wave sinusoidal signal which was fed into a gated preamplifier, the output of which was fed into, a power amplifier which amplified the signal into the range of 50 to 1000 volts. The output from the gated preamplifier was a tone burst repeated every ½ second with a gated width of 50 micro-seconds. Direct measurements of sinusoidal voltage and current were made with this circuit. The flux in the toroid is inferred from measurement of the open circuit voltage across the sense winding to reduce the effect of leakage inductance and winding resistance.

The current was measured with a resistor in the excitation winding. The voltage and current signals, respectively, were recorded with a digitizing oscilloscope. The voltage and current wave forms were digitized with a high bandwidth oscilloscope to permit a mathematical correction for the parasitic inductances and capacitances that may have occurred during testing. At that point, the data were transferred to a digital computer four analysis. Cores of each material were wound as N:N transformers with a bifilar winding pair in order to avoid inducing a differential mode voltage across the interwinding capacitances. The oscilloscope and the voltage source shared the same ground in order to avoid a current path parallel with the current resistor through the interwinding capacitances and the inductances of the winding.

Two parasitic circuit elements, the series inductance of the resistor measured as 25 nH and the parasitic capacitance across the core (760 femtoFarads) were sufficiently small that no significant error was observed to affect the experimental data. An air core winding as a function of flux density was used to calibrate the instrumental setup for high flux density measurements.

The data presented in the figures, i.e., initial permeability, permeability, loss tangent, flux density and frequency for the ferrite compositions set forth in Tables I–V were calculated directly from the data generated using the above described arrangement with respect to each torroidal ferrite. The formulas set forth below form the analytical framework from which these data were derived.

Mathematical Analysis

Initial permeability for a toroidal specimen at low flux densities was calculated using the expression:

$$\mu_{i\,tor} = \frac{1}{\mu_o} \frac{L}{N^2} \frac{2\pi}{h \ln(r_o/r_i)}$$

where $\mu$ is a proportionality constant expressed as $4\pi \times 10^{-7}$ Henry/meter, N is the number of turns about the toroid, h is the height of the toroid measured in meters, $r_o$ is the outer radius of the toroid measured in meters, $r_i$ is the inner radius of the toroid measured in meters, L is the inductance of the toroid measured in Henries, and ln is the natural logarithm. For the present invention, initial permeability was derived from data generated at a flux density of 1 Gauss.

Where the formula for inductance, L, is:

$$L = \frac{Z \sin\theta}{2\pi f}$$

Z is the impedance of the toroid measured in Ohms, f is the frequency measured in Hertz, and $\theta$ is the phase angle.

Loss tangent for each ferrite sample at low flux densities was calculated from:

$$\text{Loss Tangent} = \text{Tan}\,\delta = \frac{1}{\text{Tan}\,\theta}$$

The material permeability, which is independent of flux level, was determined from the experimental voltage and current measurements at each test frequency.

The relationship between the current, I, and the magnetizing inductance, L, is as follows:

$$V_s = L \frac{dI}{dt} = j\omega L I_p = 2\pi f L I_p \quad L = \frac{V_s}{2\pi f I_p}$$

where $V_s$ is the secondary voltage in volts, $I_p$ is the primary current measured in Amperes and f is the excitation frequency in Hz. Thus, the following expression was used to determine material permeability at various flux levels at 1 MHz frequency.

$$\mu = \frac{1}{f\mu_o n^2 h \ln\left(\frac{r_o}{r_i}\right)} \left(\frac{V_s}{I_p}\right)$$

Peak magnetic flux density can be determined directly from Ampere's law, which relates the closed path of magnetic length $l_m$, threading N loops of wire wound about the closed path, i.e., the toroid, each of which loops carries a current I, to the magnetic flux B. This relationship is defined as follows:

$$\beta_{peak} = \frac{V_{peak}}{2\pi h (r_o - r_i) Nf} \quad (\text{Webers}/m^2)$$

$$\beta_{peak} = \frac{V_{peak}}{2\pi NA_m f} \times 10^8 \text{ Gauss}$$

where $A_m = h (r_o - r_i)$ $V_{peak} = \sqrt{2} \, V_{rms}$ where $B_{peak}$ is the peak flux density in Gauss and $V_{peak}$ is the peak voltage measured in volts.

The loss tangent as a function of flux density is calculated from the equation: loss tangent equals 1/Tan θ where θ is the phase angle between the current in the primary winding and the voltage in the secondary winding. The loss tangent, also known as the loss factor, is a dimensionless quantity derived from the following relation:

$$\text{loss factor} = \text{Tan } \delta = \frac{1}{\text{Tan } \theta} = \frac{R_m}{\omega L} = \frac{\text{core loss resistance } (\Omega)}{\text{core loss reactance } (\Omega)}$$

Power loss density is a measure of the power lost per unit volume of core sample usually in Watts per cubic cm. It is expressed by the equation:

$$\text{Power loss density} = \frac{P}{v} \quad (\text{Watts}/cm^3)$$

where P is the power loss given by the expression:

$$P = \frac{V_s I_p}{2} \cos \theta \quad (\text{Watts})$$

and v is the volume of the toroid.

Cobalt (Co2+) Substituted NiZn Ferrites

As shown in the accompanying figures, Co substitution advantageously shifts the dispersion frequency to higher values and reduces permeability and losses.

Figure 2A:
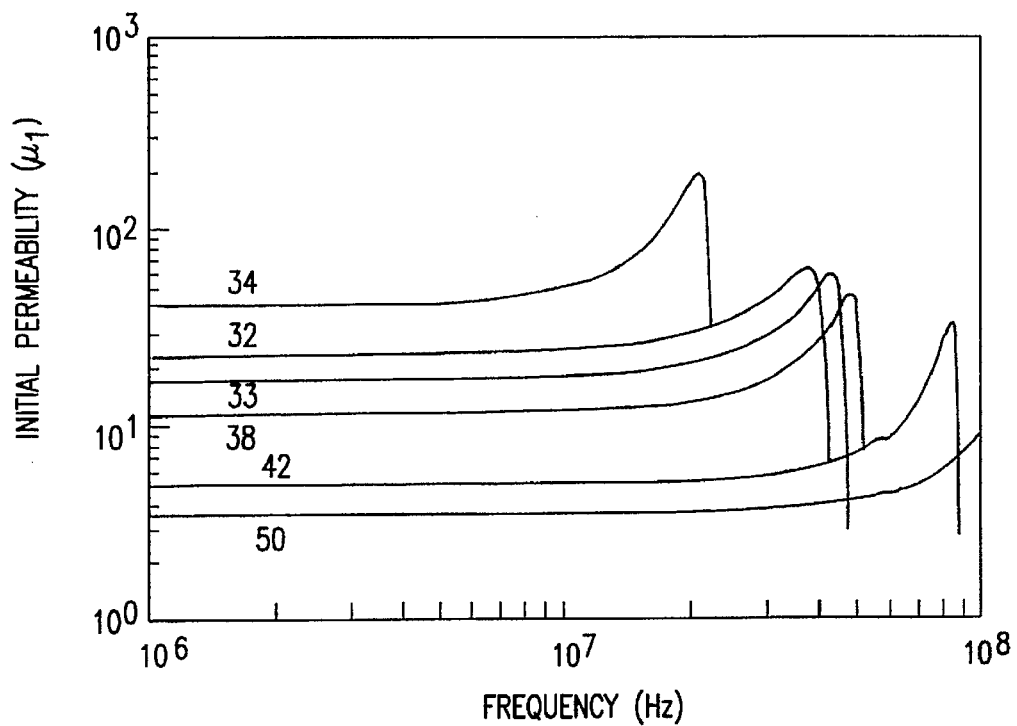
FIG. 2 depicts initial permeability and loss tangent as a function of frequency for NiZnCo ferrites.
Figure 2B:
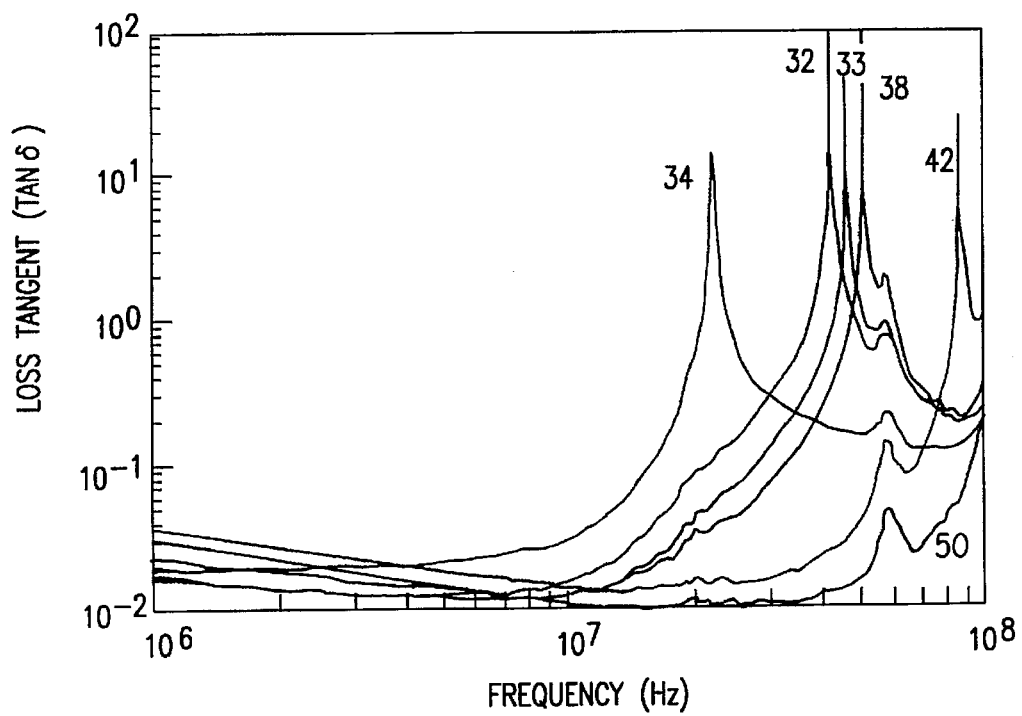

FIG. 2 shows the variation of initial permeability and loss tangent for various cobalt substitutions (Table I) as a function of frequency. A range of initial permeability and loss tangent values are observed as a function of cobalt substitution. Initial permeability is observed to increase with cobalt substitution as compared to the unaltered nickel-zinc ferrites. The increase in permeability due to the $Co^{2+}/Co^{3+}$ addition is probably due to the replacement of $Ni^{2+}$ ions with $Co^{2+}$ and $Co^{3+}$ of larger Bohr magnetons at the octahedral site. This increases the net magnetization of the system and the resultant permeability values.

FIG. 2 also shows the decrease of initial permeability as well as loss tangent with the increase of $Co^{2+}$ ions. While not wishing to be bound by theory, it is believed that the decrease of initial permeability and loss tangent as a function of increasing $Co^{2+}$ substitution occurs because $Co^{2+}$, a highly magnetically anisotropic ion, diffuses among nonequivalent octahedral sites to those closest to the direction of magnetization. This preferential occupation produces an anisotropy along the magnetization direction. In the vicinity of a domain wall, this anisotropy serves to create a potential well for the domain wall, thus inhibiting large excursions of the wall during low-level excitations. This reduces the permeability and, more importantly, reduces the losses.

Figure 3A:
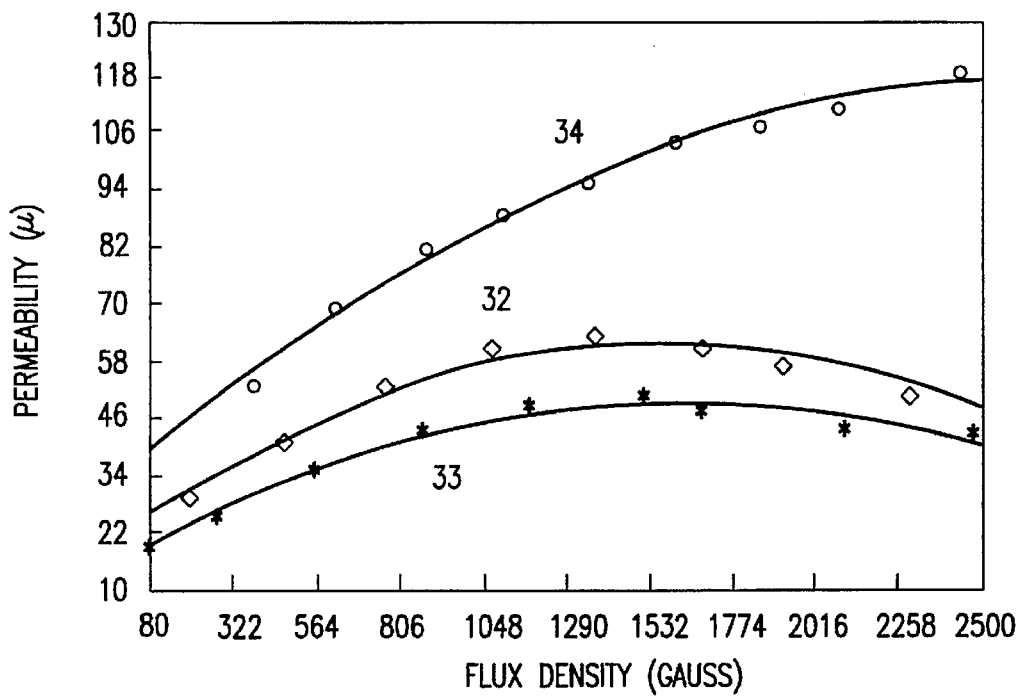
FIGS. 3 and 4 depict permeability and loss tangent as a function of flux density for NiZnCo ferrites.
Figure 3B:
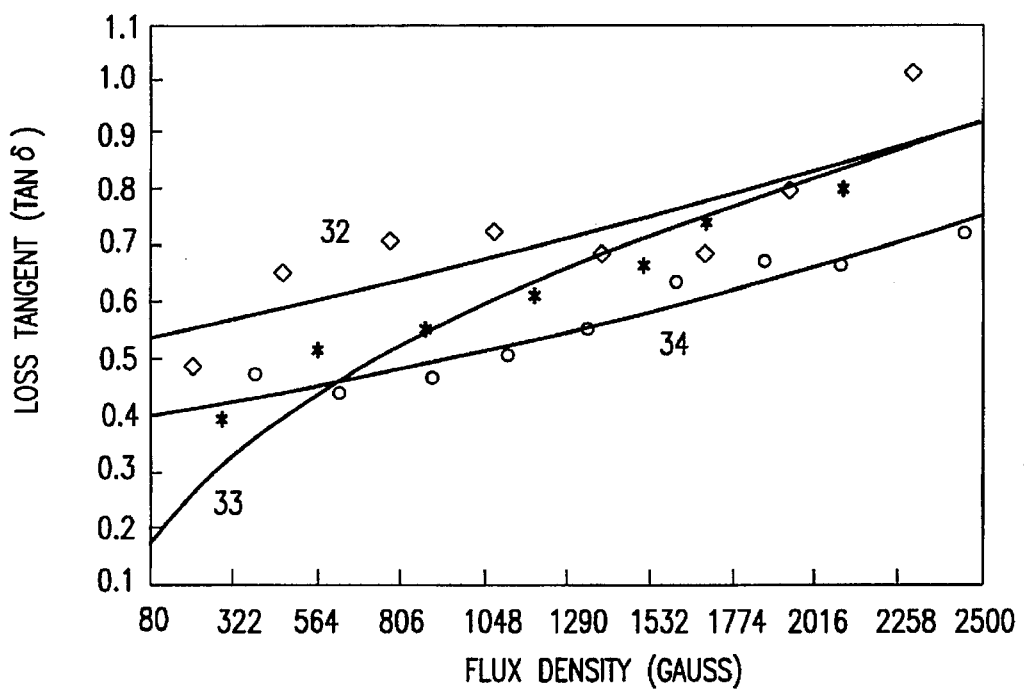
Figure 4A:
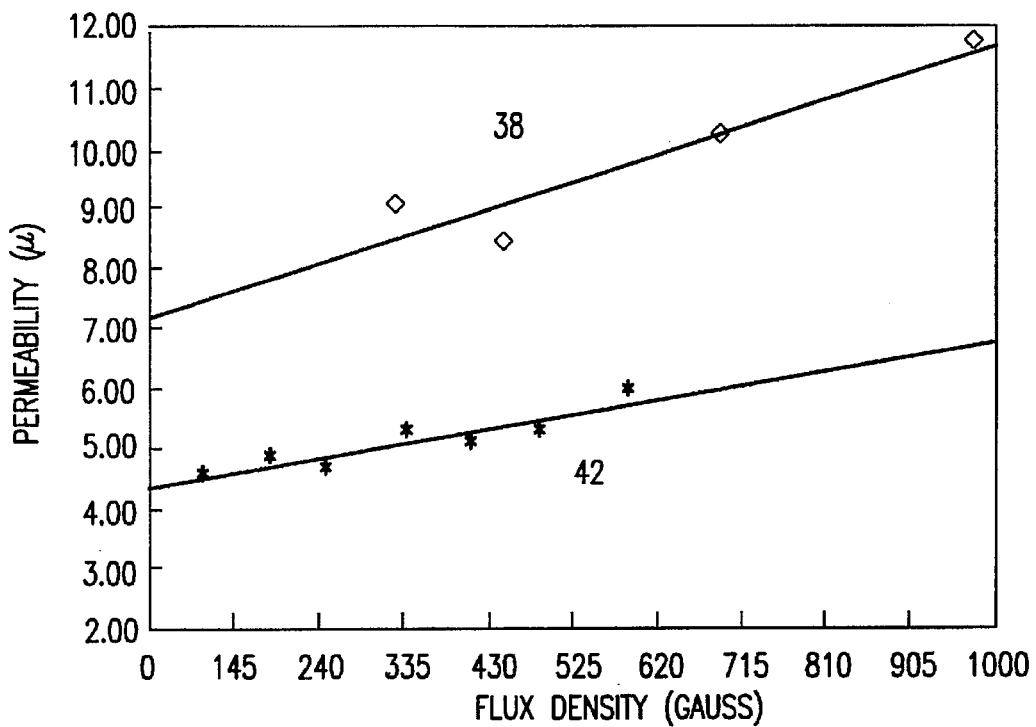
Figure 4B:
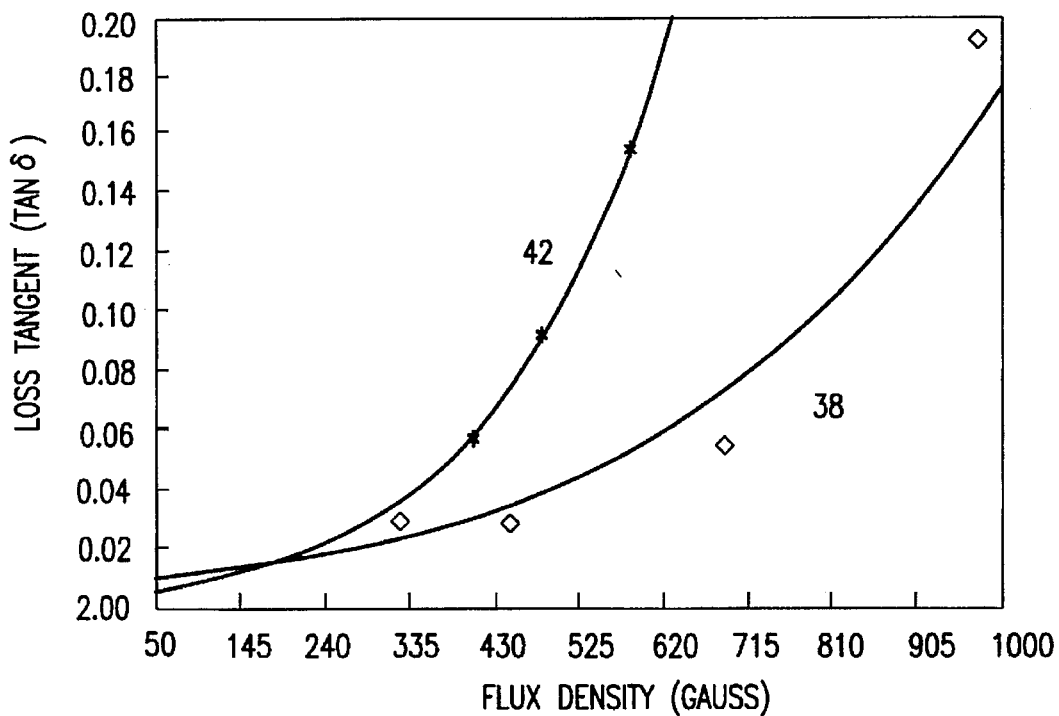

The dispersion frequency is observed to be greater than 40 MHz for high cobalt concentration samples. Sample 34, with an initial permeability of 40 ($Ni_{0.86}Zn_{0.1}Co_{0.04}Fe_2O_4$), was chosen as the basic nickel-zinc-cobalt ferrite composition for various substitution ions in order to further enhance the magnetic properties of the ferrite for high frequency applications. The basic NiZnCo ferrite composition can be chosen depending on the application, because initial permeability and loss tangent values for Co substituted NiZn ferrites have a wide range as shown in FIG. 2. FIGS. 3 and 4 also show the variation of initial permeability and loss tangent with flux density for various cobalt substitutions. Higher permeability values again are observed to correspond to lower losses as a function of flux density.

Table 1 shows the bulk density and Curie temperature values for various NiZnCo ferrites. Apparent bulk density is observed to show an increasing trend with the increase of $Co^{2+}$ concentrations. Curie temperature is observed to be greater than 500° C. for all samples. The Curie Temperature is the temperature above which the spin alignment of the magnetic ions, due to thermal random motion, are no longer effective for exchange interactions such that the spontaneous magnetization of the material vanishes by changing to the paramagnetic state. The Curie temperature thus sets the working limit of temperature for the magnetic materials, and it defines the operating temperature range of these materials when used in high frequency applications.

As can be readily seen from FIGS. 2 through 5, according to the methods and compositions in the present invention, one may produce a nickel-zinc-cobalt ferrite material of the formula $Ni_{1-x-y}Zn_xCo_yFe_2O_4$ where x is from about 0.35 to about 0.7 and y is from about 0.001 to 0.04 to obtain a ferrite characterized by reduced losses and high permeability, or where x is from about 0.01 to about 0.35 and y is from about 0.001 to about 0.25 to obtain a ferrite characterized by reduced losses and low permeability.

Chromium ($Cr^{3+}$) Substituted NiZnCo Ferrites

A series of Cr substituted NiZnCo ferrites were prepared based on sample 34 according to the process described above. As shown in the accompanying figures, I have discovered that Cr substitution shifts the dispersion frequency to even higher levels and further reduces power loss density and the slope of the loss tangent versus flux density curve.

Figure 5A:
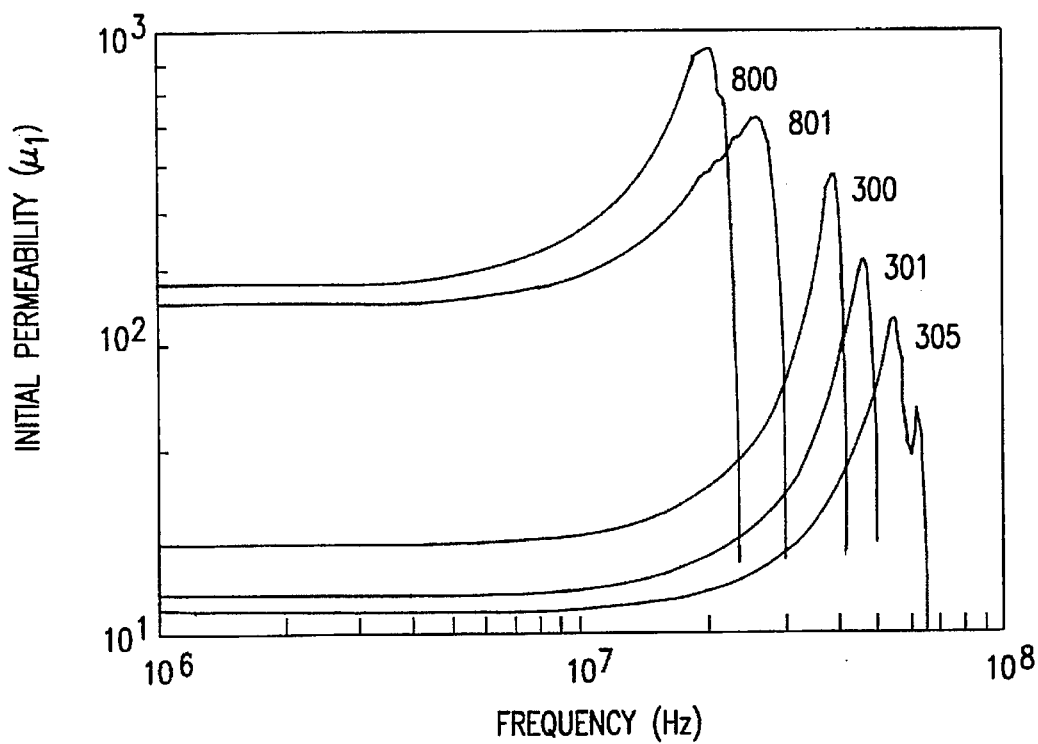
FIGS. 5 and 6 depict initial permeability and loss tangent as a function of frequency for NiZnCoCr ferrites.
Figure 5B:
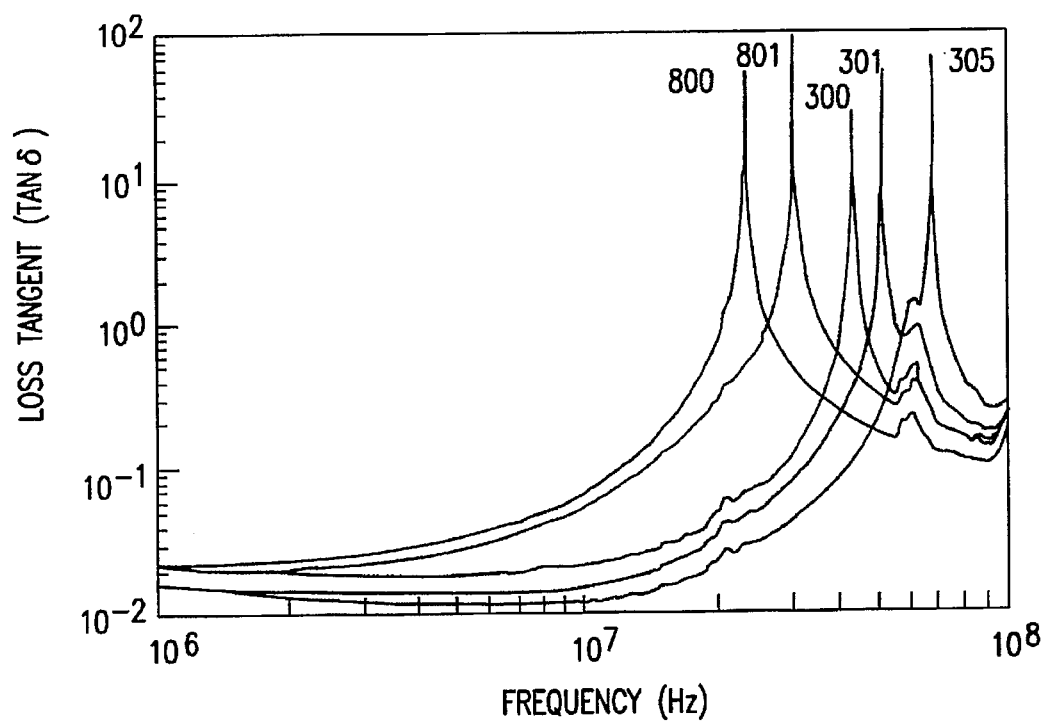
Figure 6A:
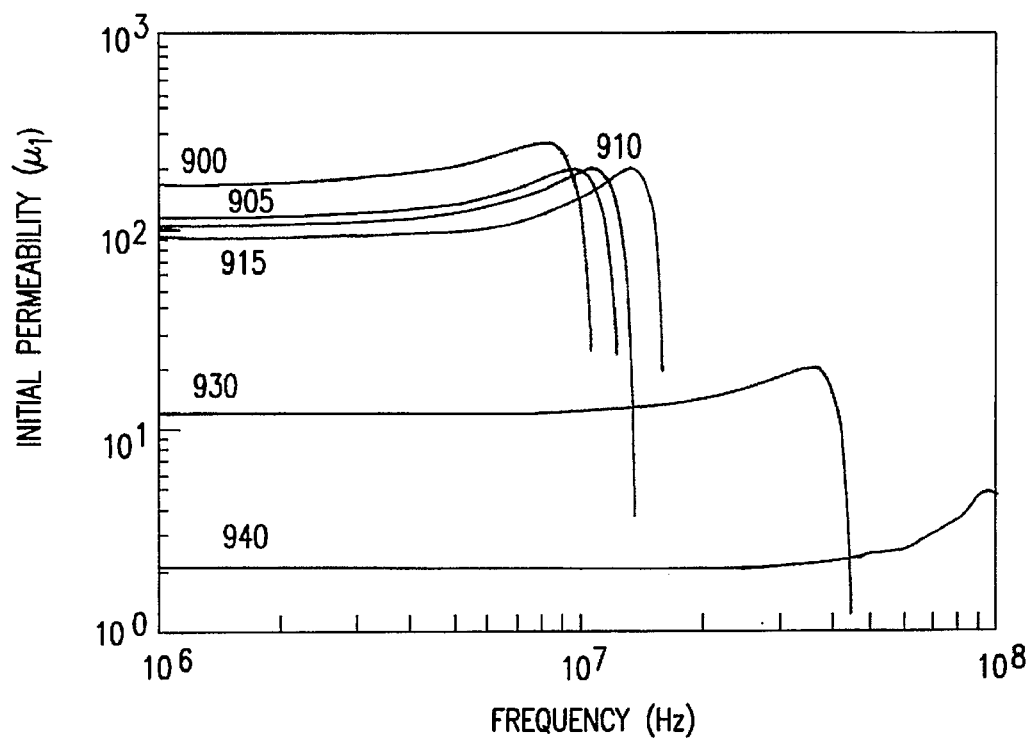
Figure 6B:
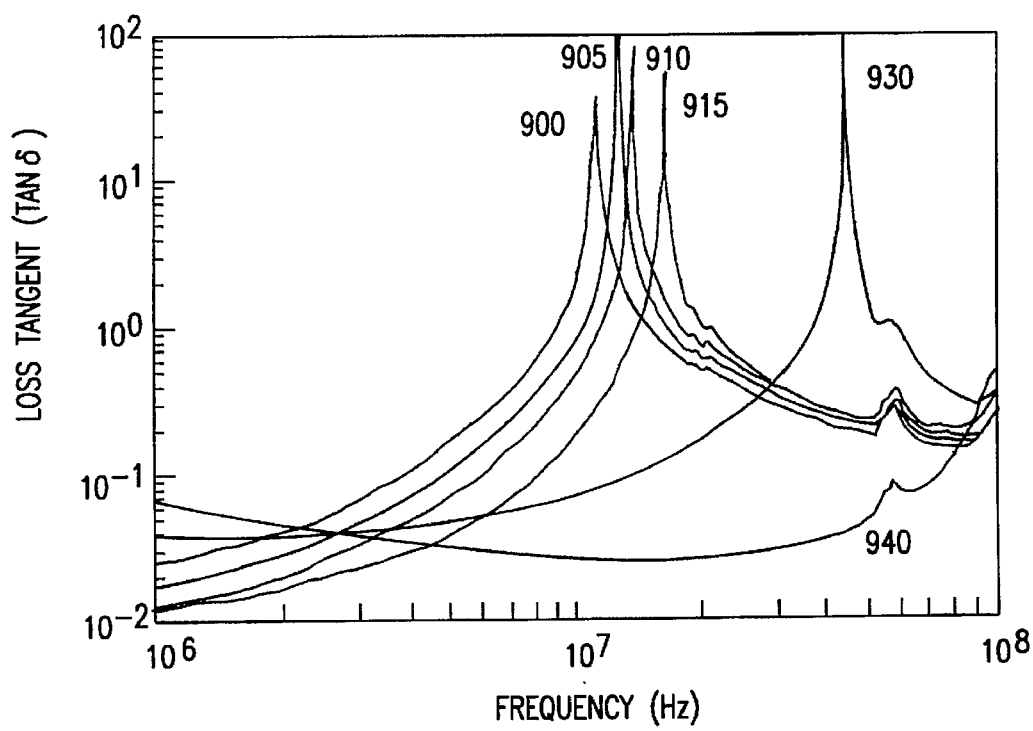

Referring now to FIGS. 5 and 6, these Figures show the variation of initial permeability and loss tangent for chromium ($Cr^{3+}$) substitutions (Table II) as a function of frequency. Initial permeability and loss tangent were observed to decrease with increasing $Cr^{3+}$ ionic substitutions.

Figure 7A:
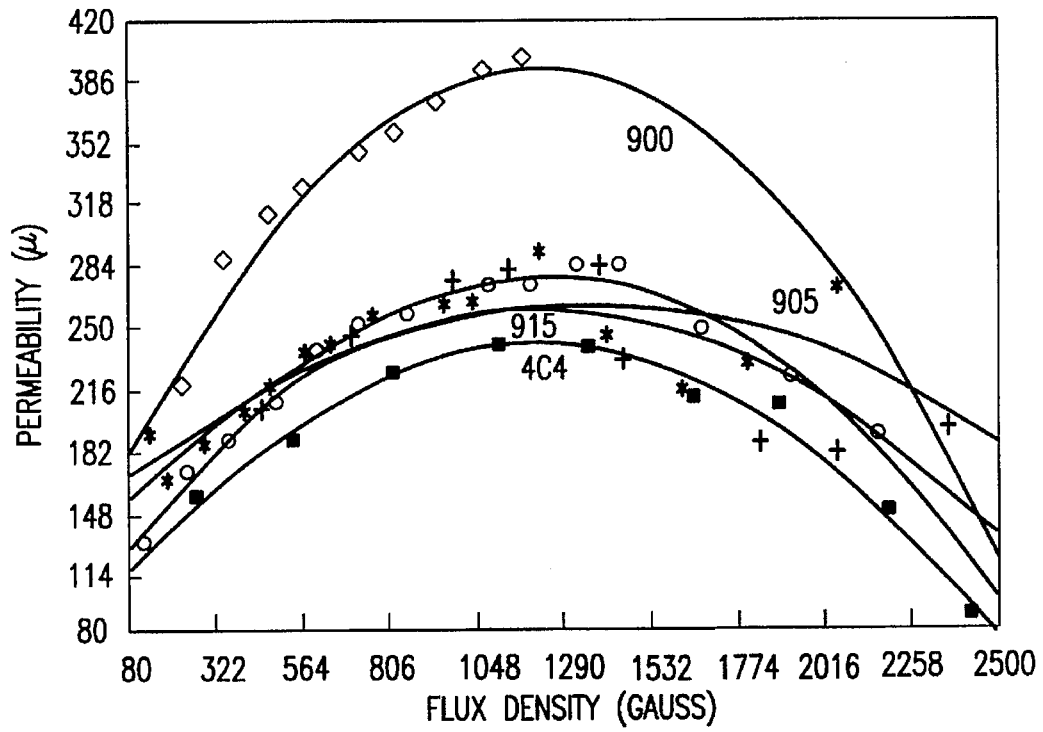
FIG. 7 depicts permeability and loss tangent as a function of flux density for NiZnCoCr ferrites.
Figure 7B:
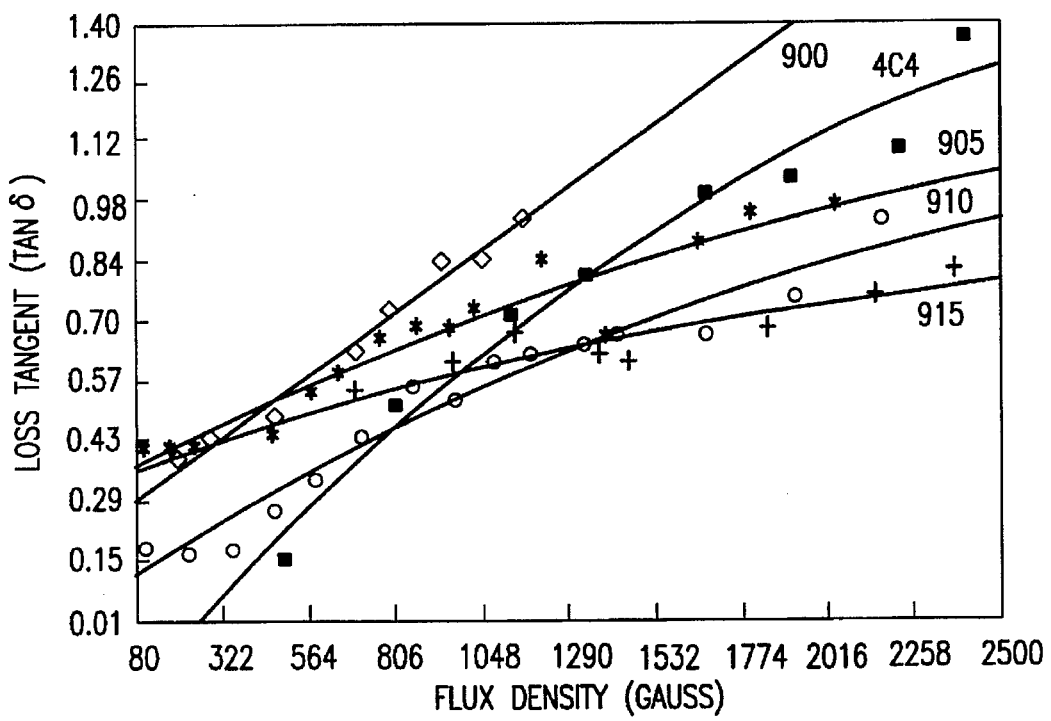

FIG. 7 shows the variation of permeability and loss tangent for chromium ($Cr^{3+}$) ionic substitutions as a function of flux density. The results are also compared with the commercially available 4C4 (ferroxcube) sample. Permeability is observed to decrease as a function of increased chromium substitutions as compared to unaltered compositions (but is higher than the 4C4 sample). Loss tangent is observed to decrease with chromium substitution as compared to the unaltered composition.

Chromium ionic substitutions have further advantages in improving the temperature coefficient of permeability of NiZnCo ferrite materials. Use of chromium thus presents the opportunity of obtaining either a positive or a negative temperature coefficient within a given range of temperatures.

Further optimization of the processing parameters (time and temperature) and amount of $Cr^{3+}$ ionic substitution in polycrystalline ferrites, results in a ferrite with high permeability, reduced losses, improved temperature coefficient of permeability and higher dispersion frequency than commercially available ferrite materials.

Figure 8A:
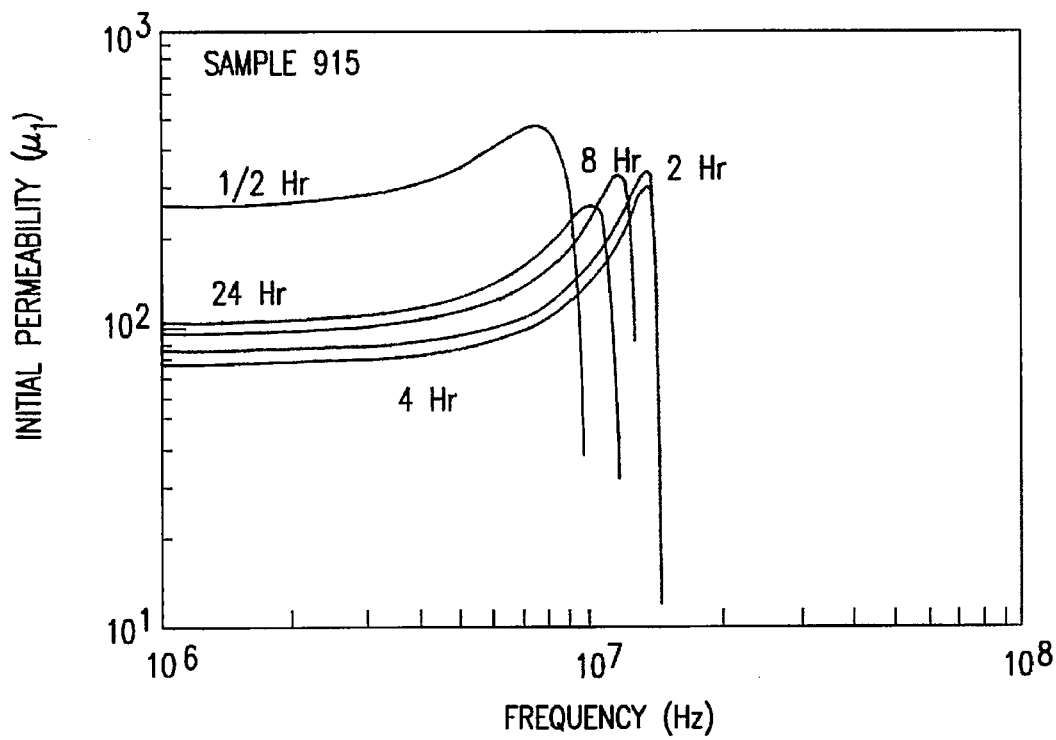
FIG. 8 depicts initial permeability and loss tangent as a function of frequency for NiZnCoCr ferrites fired at 1250° C. for various sintering times.
Figure 8B:
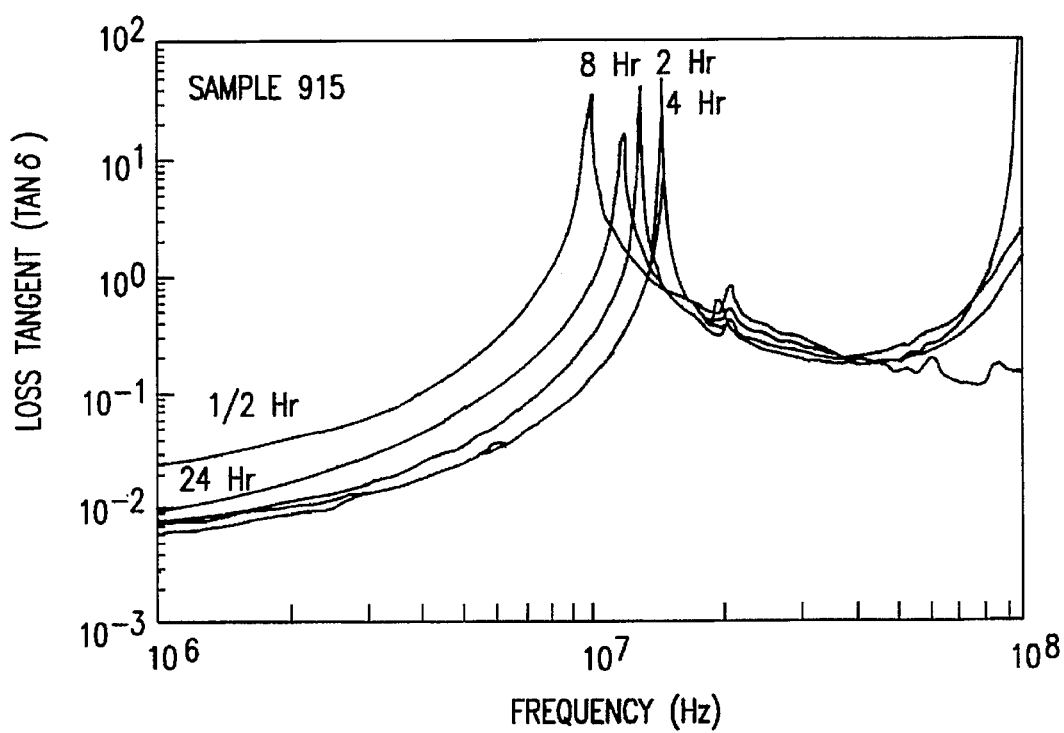
Figure 9A:
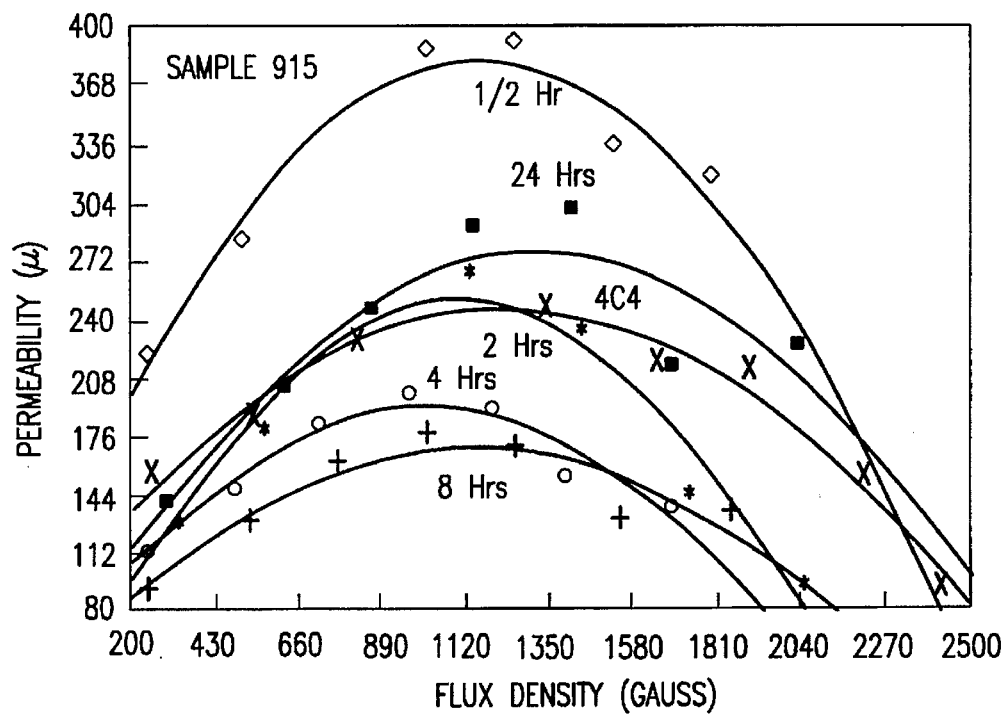
FIG. 9 depicts permeability and loss tangent as a function of flux density for NiZnCoCr ferrites fired at 1250° C. for various sintering times.
Figure 9B:
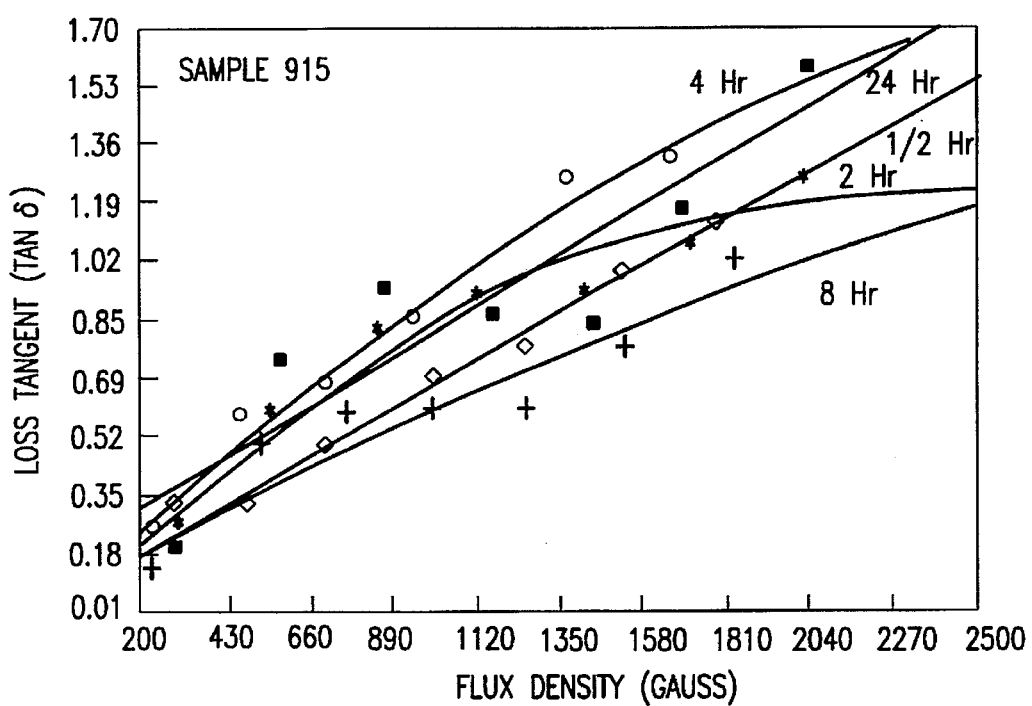
Figure 10A:
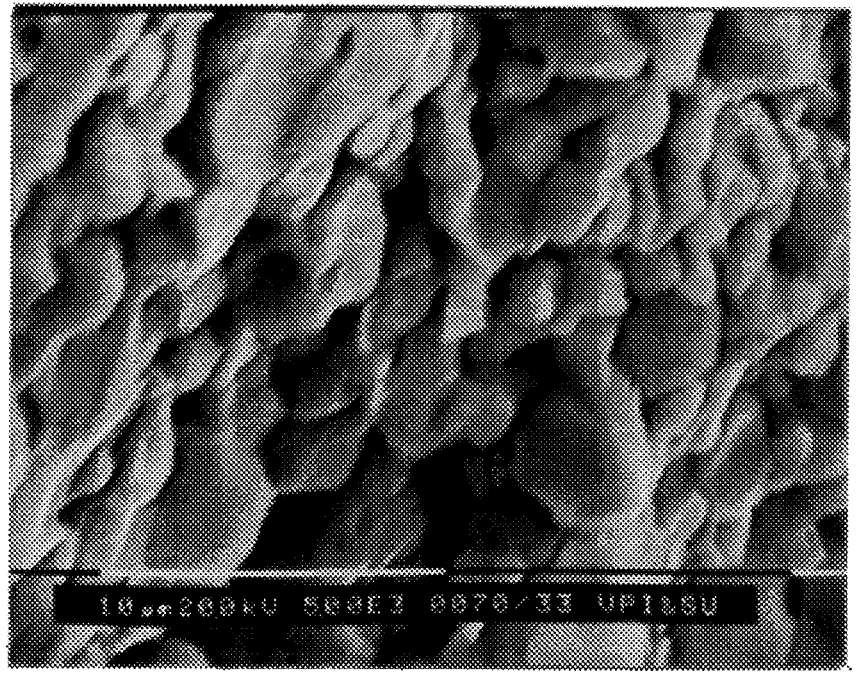
FIG. 10 shows scanning electron secondary images for various sintering times at 1250° C. for NiZnCoCr ferrites.
Figure 10B:
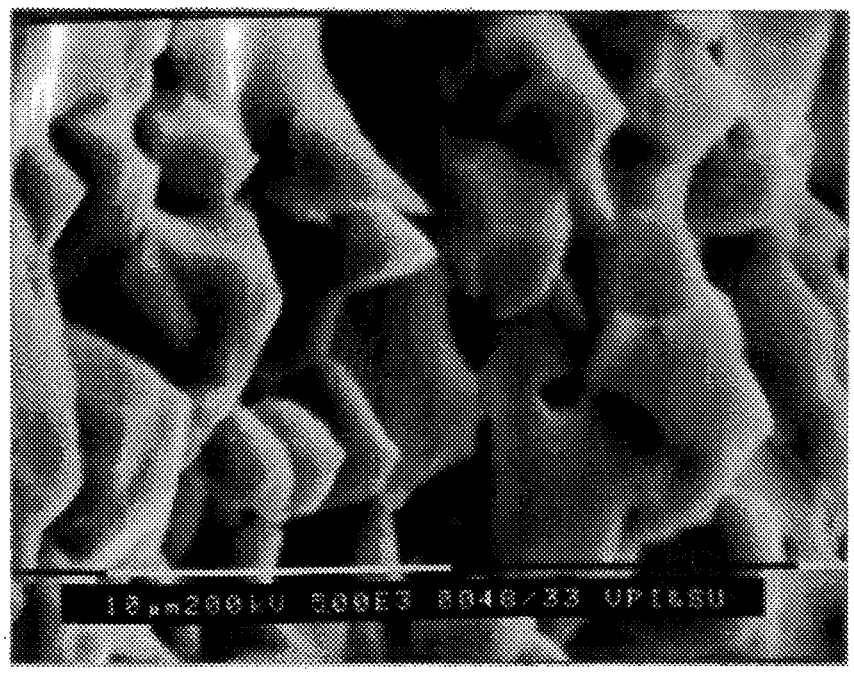
Figure 10C:
Figure 10D:
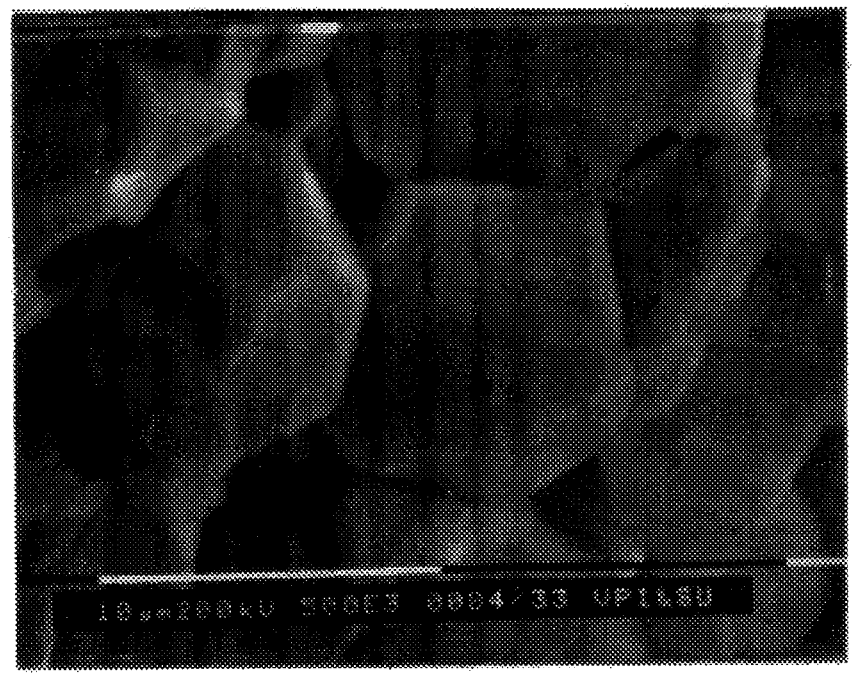

For example, sample 915 ($Ni_{0.31}Zn_{0.5}Co_{0.04}Cr_{0.15}Fe_2O_4$) was fired at 1250° C. for various times under similar firing conditions. FIGS. 8 and 9 show the variation of initial permeability, permeability and loss tangent as a function of frequency and flux density. Initial permeability, permeability and loss tangent are observed to be sensitive to the sintering time. FIG. 10 shows the scanning electron secondary images of freshly fractured samples. FIGS. 8 and 9 also show that high initial permeability and larger losses correspond to larger grain size, whereas grain size was observed to increase with sintering time as seen from FIG. 10. However, increased initial permeability and permeability associated with a sintering time of ½ hour having an average grain diameter of 2 um is also observed.

Figure 11A:
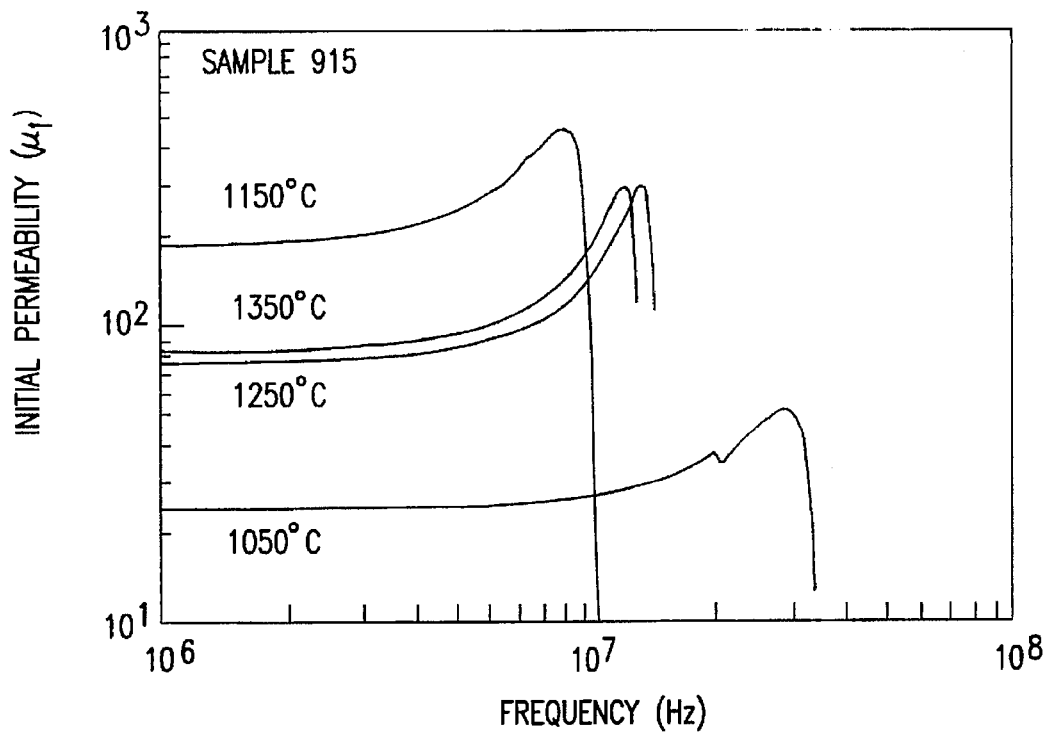
FIG. 11 depicts initial permeability and loss tangent as a function of frequency for NiZnCoCr ferrites fired at various sintering temperatures for 4 hours.
Figure 11B:
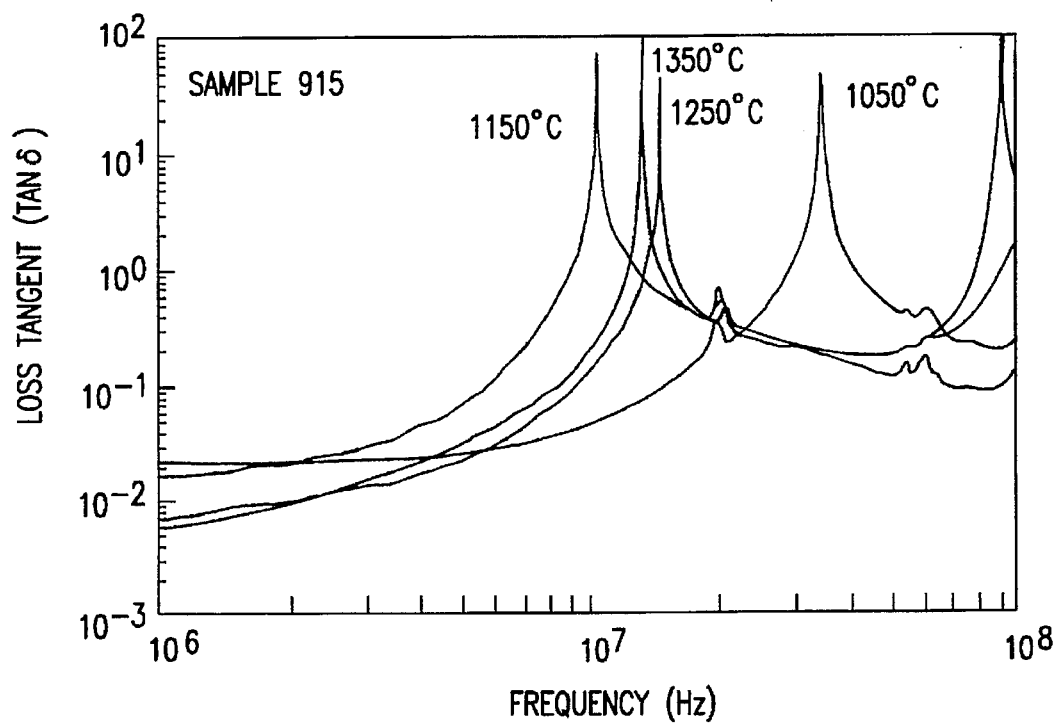
Figure 12A:
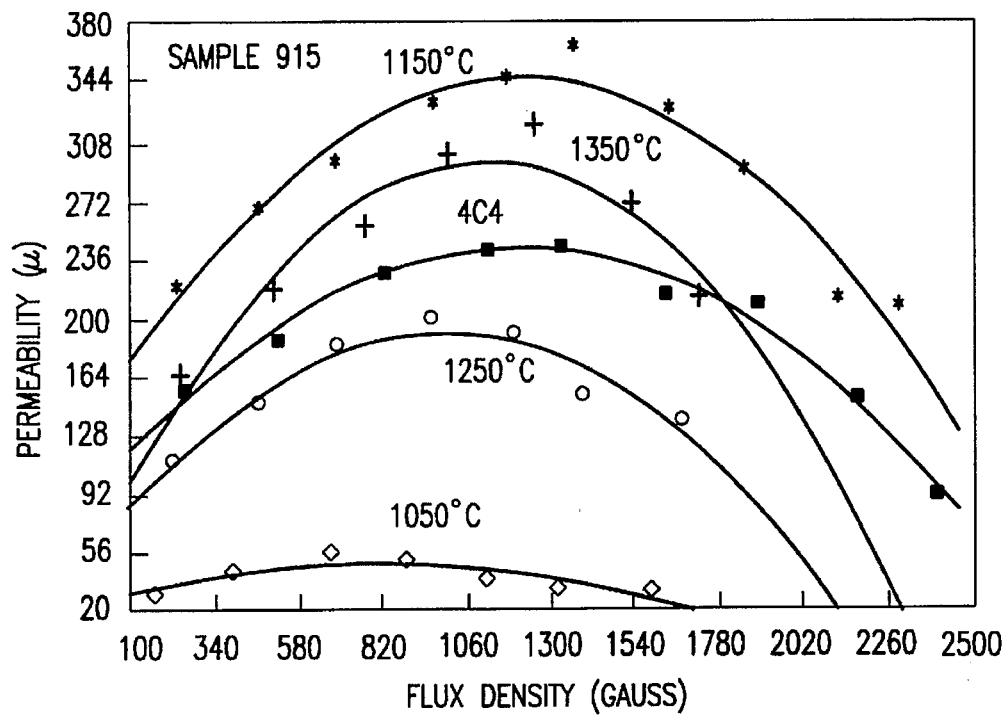
FIG. 12 depicts permeability and loss tangent as a function of flux density for NiZnCoCr ferrites fired at various sintering temperatures for 4 hours.
Figure 12B:
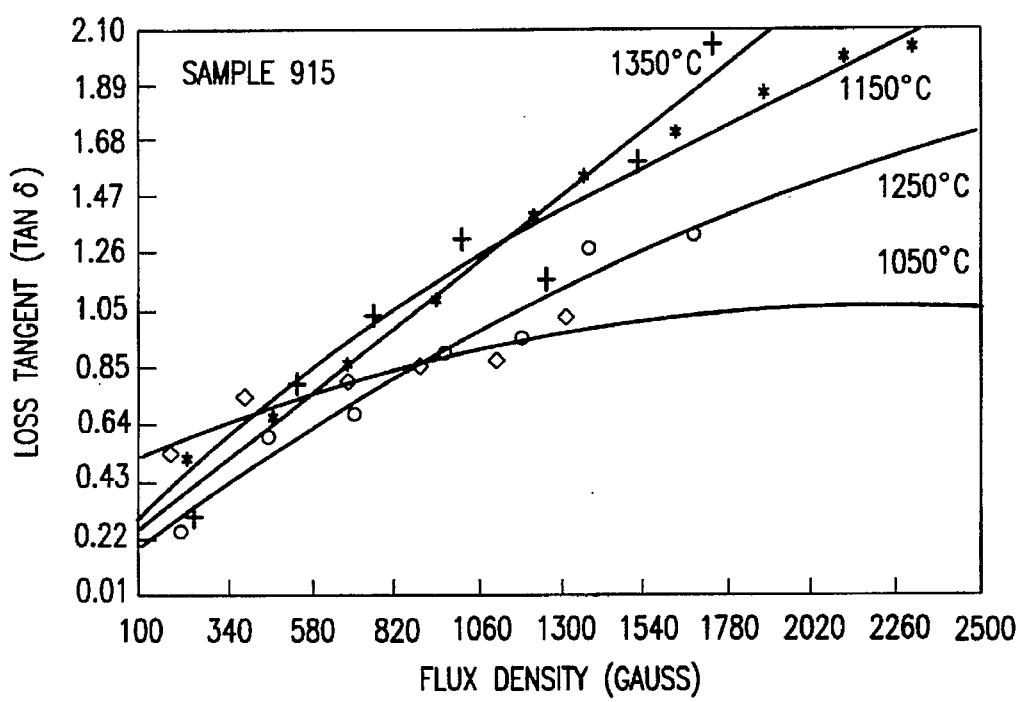
Figure 13A:
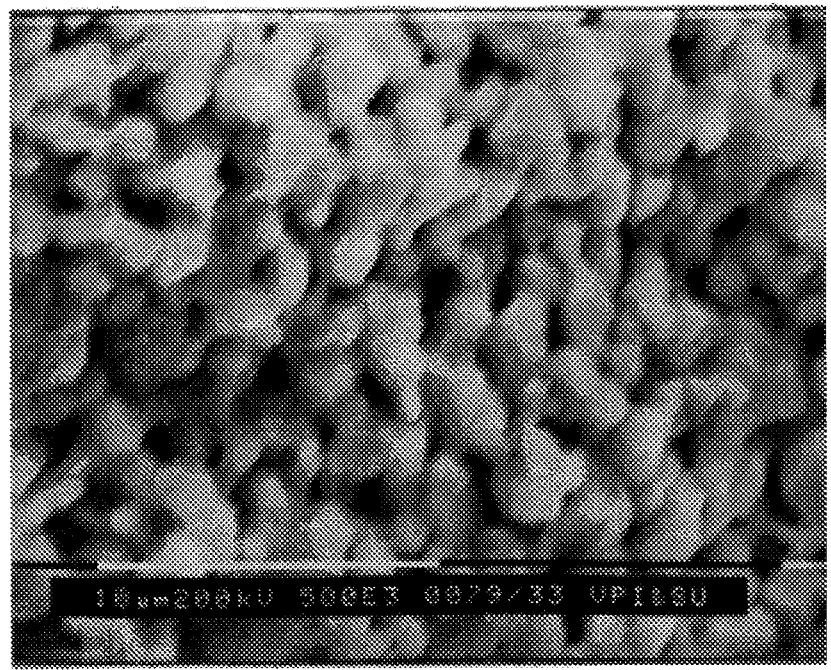
FIG. 13 shows scanning electron secondary images at various sintering temperatures for 4 hours for NiZnCoCr ferrites.
Figure 13B:
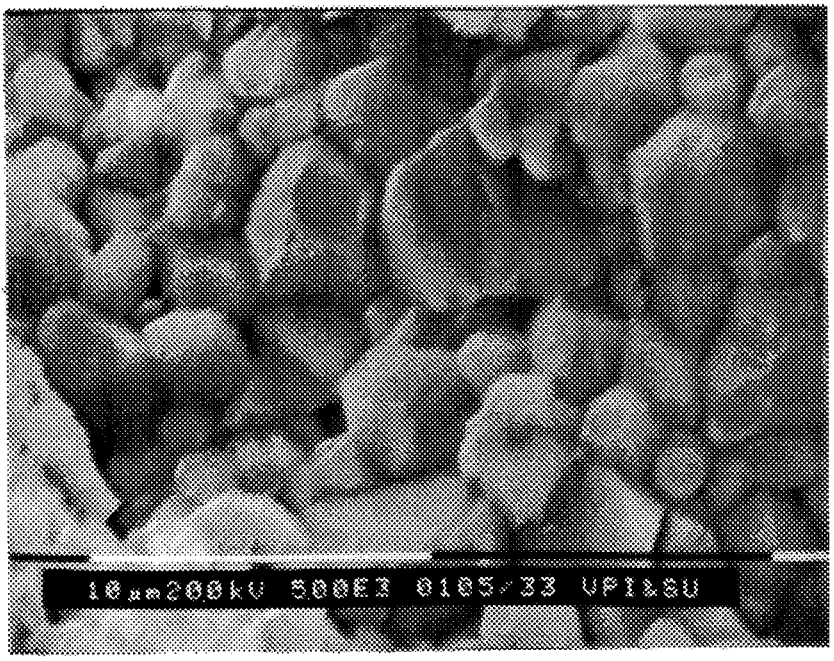
Figure 13C:
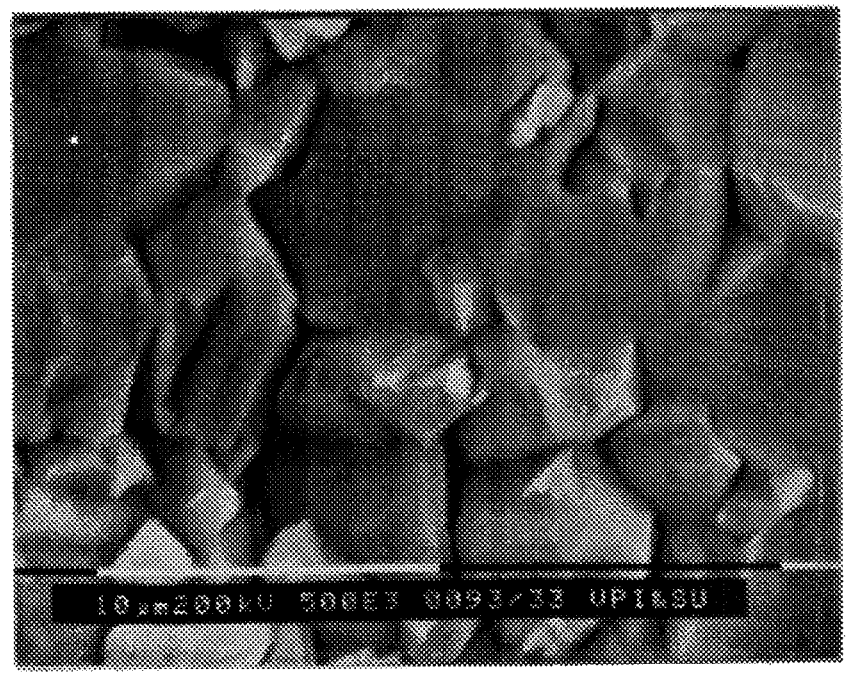
Figure 13D:
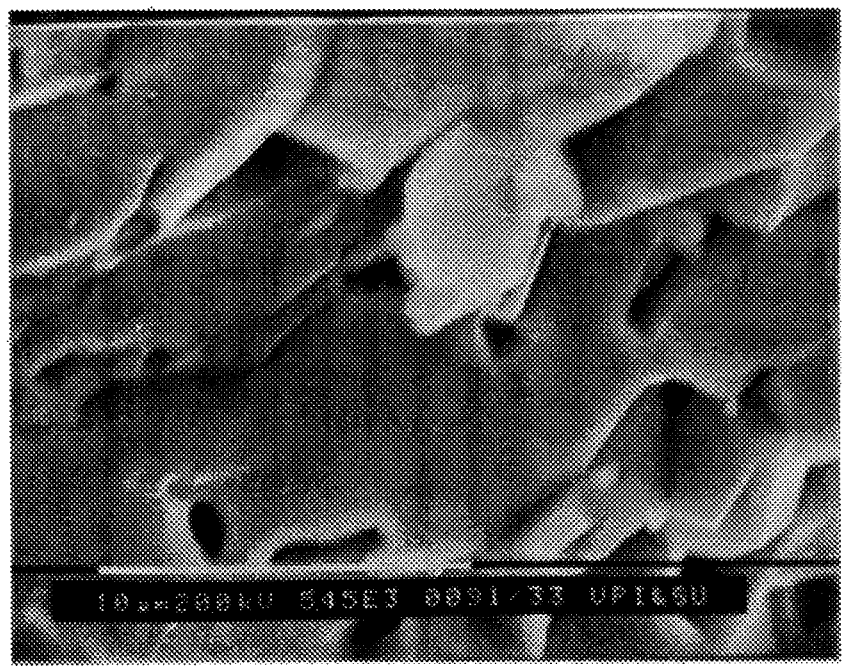

FIGS. 11 and 12 show the variation of initial permeability, permeability and loss tangent for sample 915 when fired at various temperatures for 4 hours under similar firing conditions. FIG. 13 shows the scanning electron secondary images of the samples. Higher initial permeability and loss tangent values are observed to correspond to larger grain size, while the grain size is observed to increase with sintering temperature as seen from FIG. 13; however, increased initial permeability and permeability for samples fired at 1150° C. having a grain size 2.5 um are again observed. FIGS. 8 through 13 thus demonstrate the necessity of optimizing the sintering parameters of time and temperature in obtaining desired properties of ferrites for specific applications.

Figure 14A:
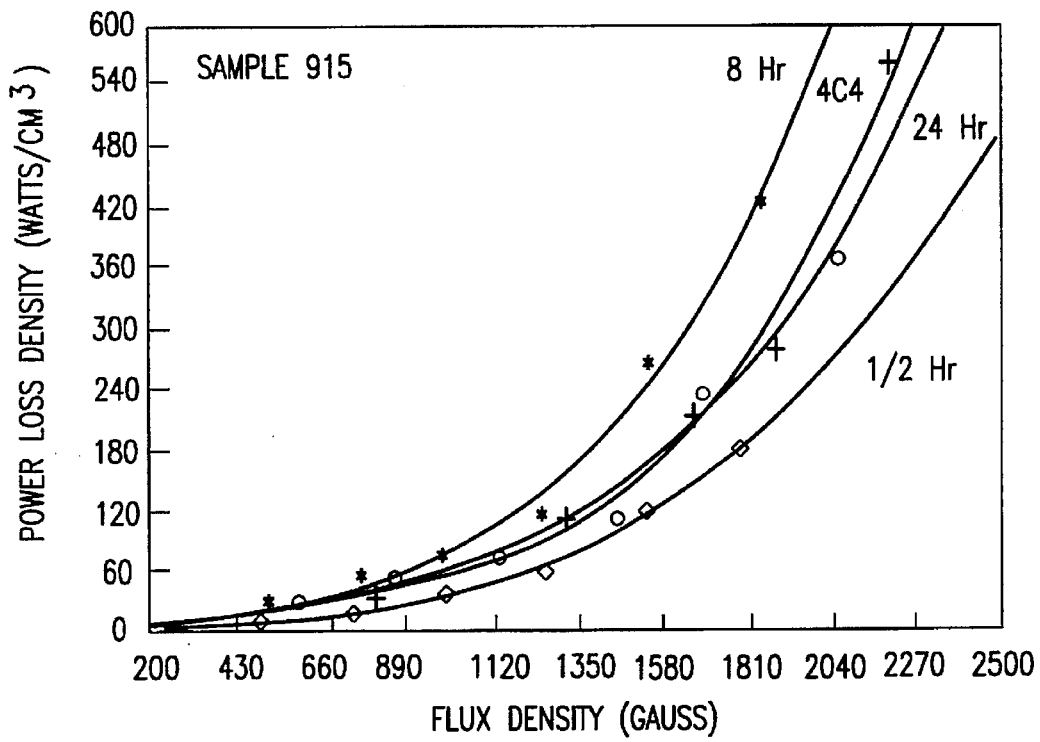
FIG. 14 depicts power loss density as a function of flux density for various sintering times at 1250° C. and for various sintering temperatures for 4 hours.
Figure 14B:
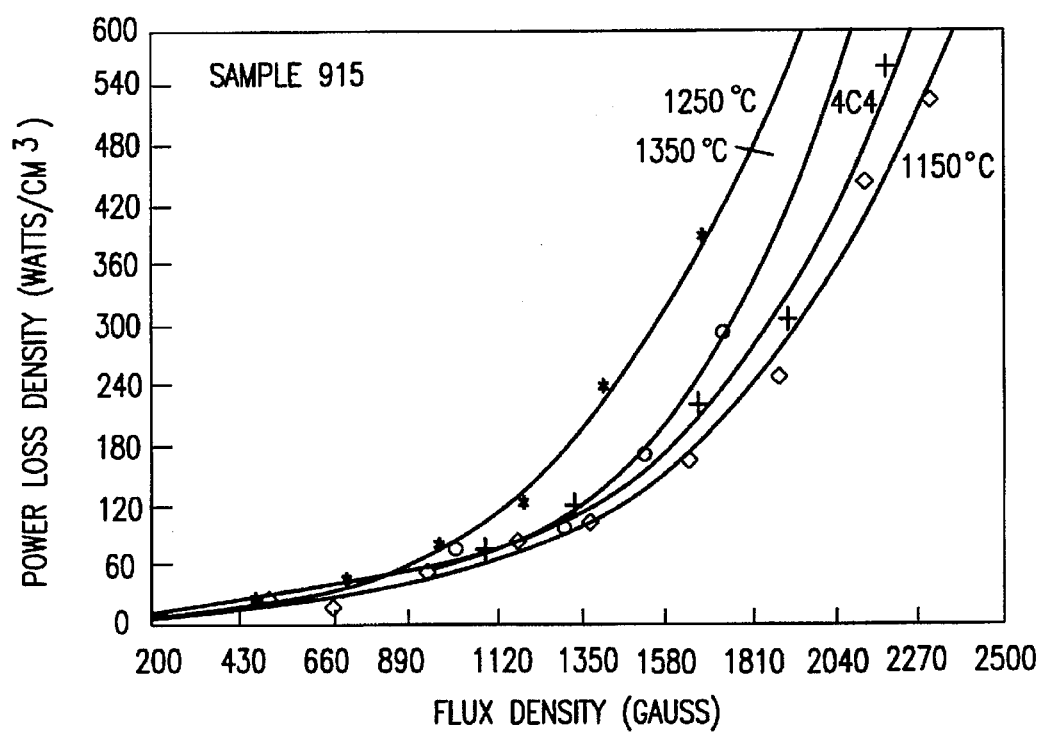

FIG. 14 shows the power loss density (Watts/cm³) as a function of flux density for sample 915 for various time and temperature conditions. From the comparative results of FIGS. 9, 12 and 14, it is seen that two samples of 915 with sintering temperature at 1250° C. for ½ and sintering temperature of 1150° C. for 4 hours have much higher permeability and lower power loss density in the flux density range of 200 to 2500 Gauss as compared to the commercially available Ferroxcube 4C4 sample. Whereas the sample 915 with 24 hour sintering at 1250° C. has higher permeability but comparable power loss density to the 4C4 sample, sample 915 at 1150° C. for 4 hours and sample 915 at 1250° C. for ½ hour advantageously exhibit permeability values 40% and 60% higher and power loss density 10% and 35% lower than the commercially available 4C4 Ferroxcube material at a flux density of 1000 Gauss and 1 MHz frequency.

Table II shows the variation of apparent bulk density and Curie temperature variation as a function of chromium substitutions. Density is observed to decrease with increasing $Cr^{2+}$ substitutions, whereas Curie temperature is observed to be greater than 298° C. for all samples.

As can be readily seen from FIGS. 5 through 14, by virtue of the present invention one can obtain ferrite materials of the composition $Ni_{1-x-y-z}Zn_xCo_yCr_zFe_2O_4$ exhibiting ultra-low power loss density, and either high or low magnetic permeability depending upon the sintering conditions and the values of x, y and z. For values of x from about 0.35 to about 0.7, y from about 0.001 to about 0.25 and z from about 0.01 to about 0.2, one can obtain high permeability ferrites. For x from about 0.01 to about 0.35, y from about 0.001 to about 0.25 and z from about 0.01 to about 0.4, one can obtain low permeability ferrites that exhibit reduced power loss characteristics.

Manganese (CMn2+) Substituted NiZnCo Ferrites

A series of Mn substituted NiZnCo ferrites were prepared according to the process described above. As shown in the accompanying figures, we have found that Mn substitution advantageously results in increased initial permeability, magnetic permeability and reduced loss tangent at high flux density.

Figure 15A:
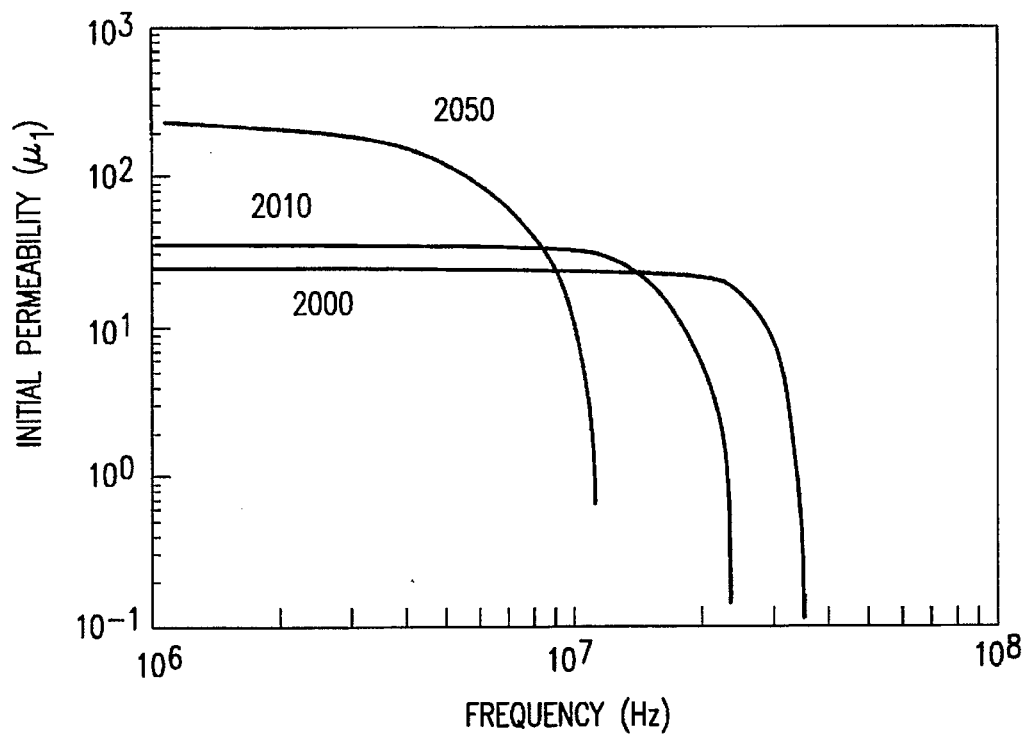
FIGS. 15, 16 and 17 depict initial permeability and loss tangent as a function of frequency for NiZnCoMn ferrites.
Figure 15B:
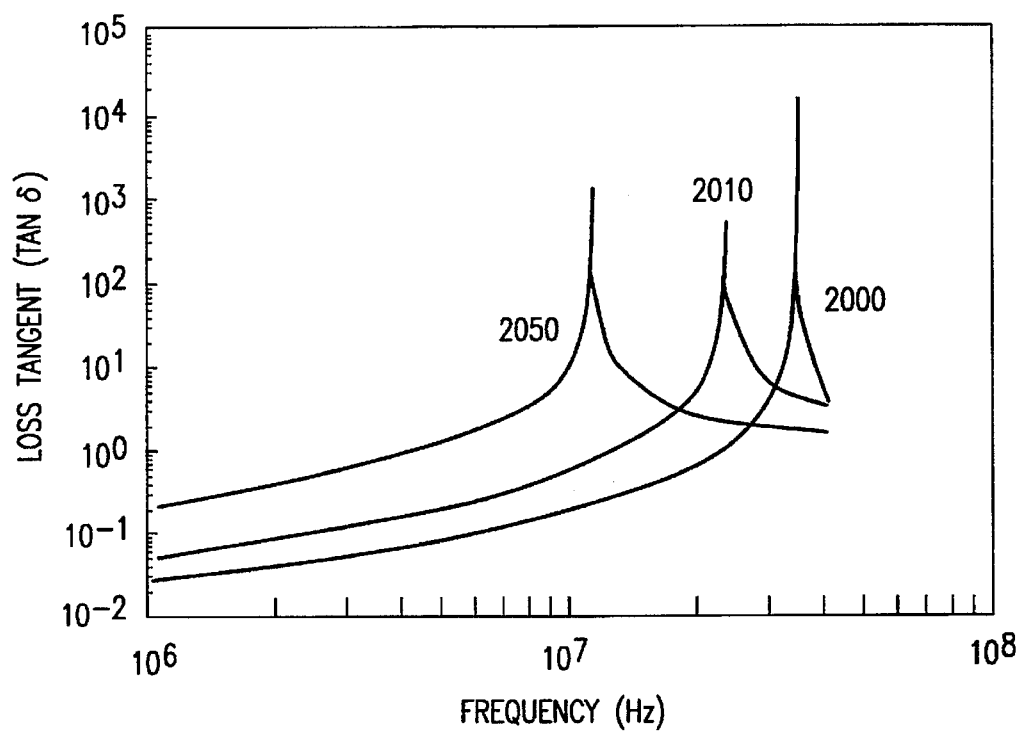
Figure 16A:
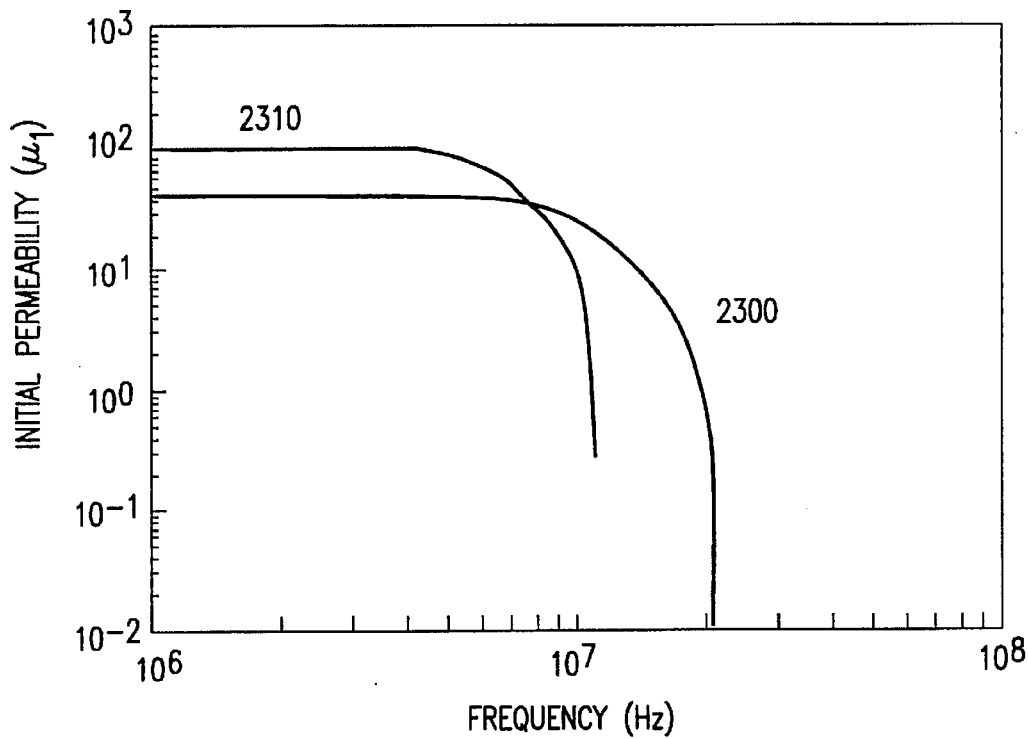
Figure 16B:
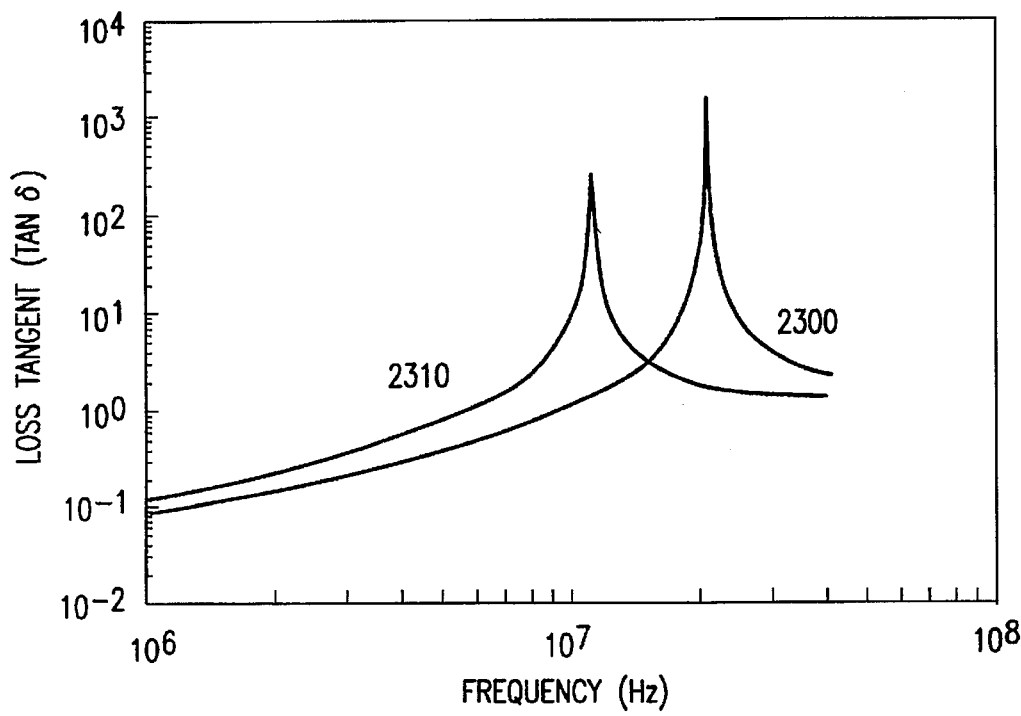
Figure 17A:
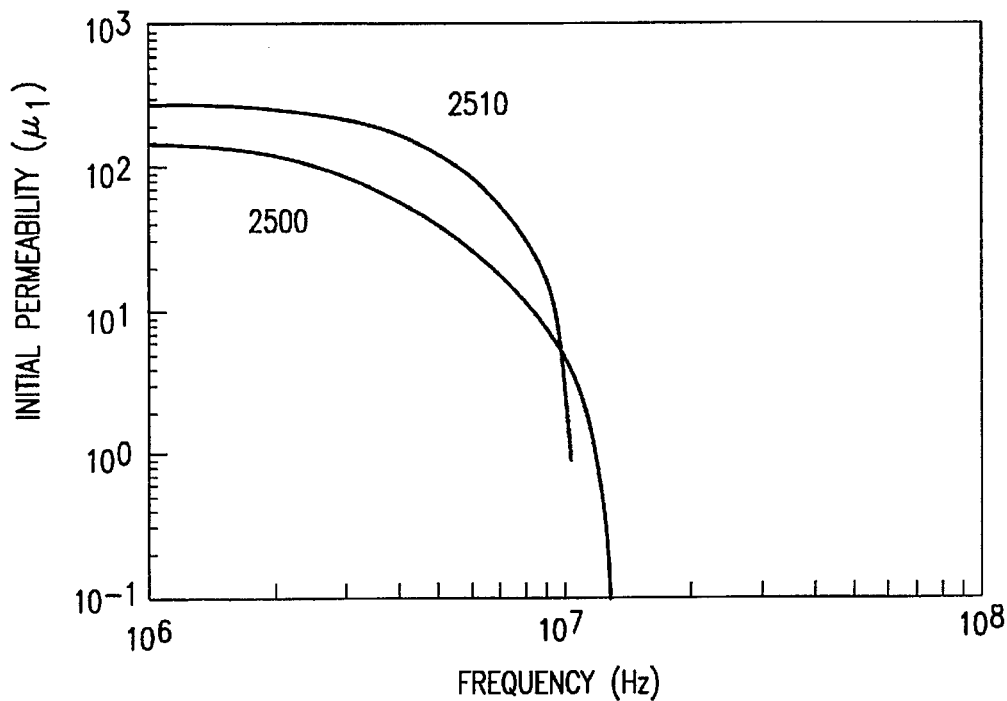
Figure 17B:
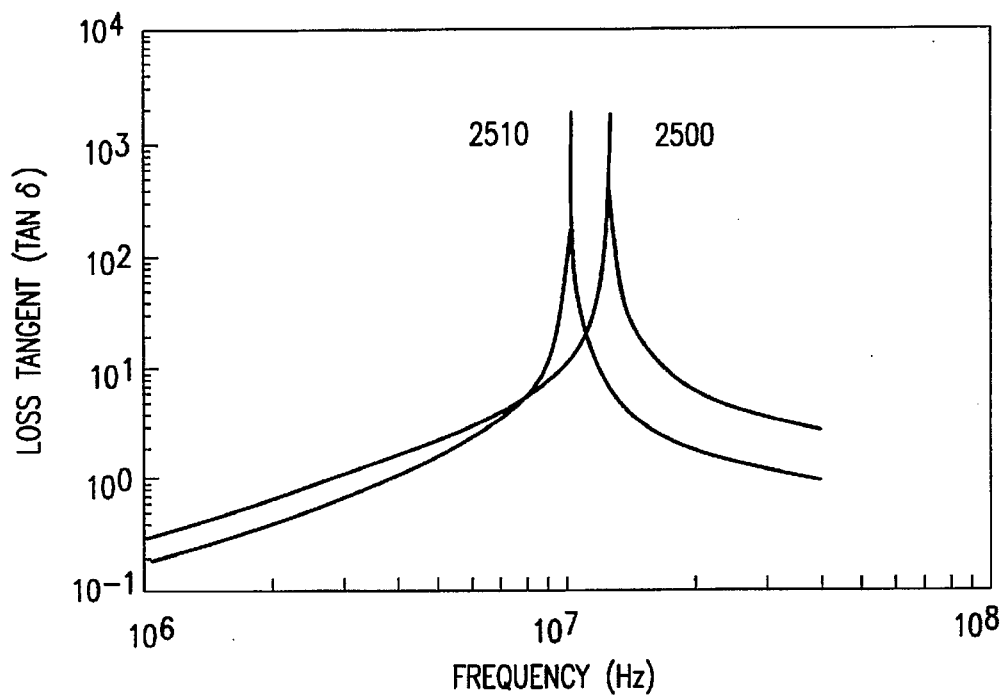

FIGS. 15, 16 and 17 show the variation of initial permeability and loss tangent for various manganese ($Mn^{2+}$) substitutions (Table III) in NiZnCo ferrite as a function of frequency. FIGS. 15–17 show the increase of initial permeability and loss tangent with increased concentration of $Mn^{2+}$ ions when sintered at 1275° C. for 4 hours. The increased initial permeability with increased $Mn^{2+}$ ions is attributed to the replacement of the $Ni^{2+}$ with $Mn^{2+}$ ions. Dispersion frequency is observed to decrease with increase of manganese ionic substitutions.

Figure 18A:
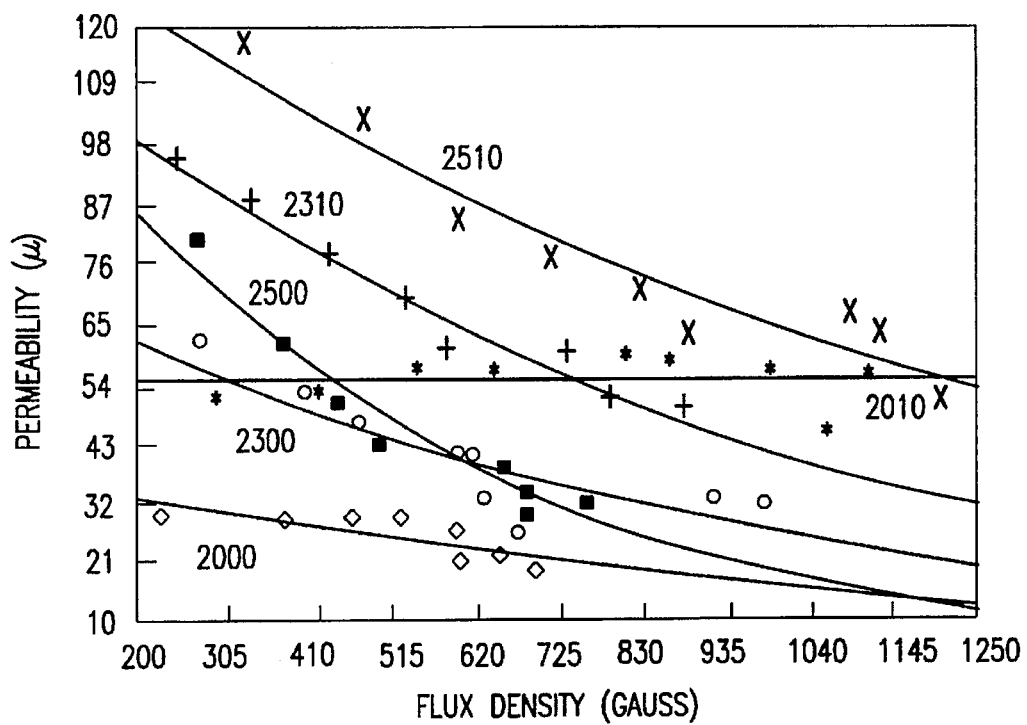
FIG. 18 depicts permeability and loss tangent as a function of flux density for NiZnCoMn ferrites.
Figure 18B:
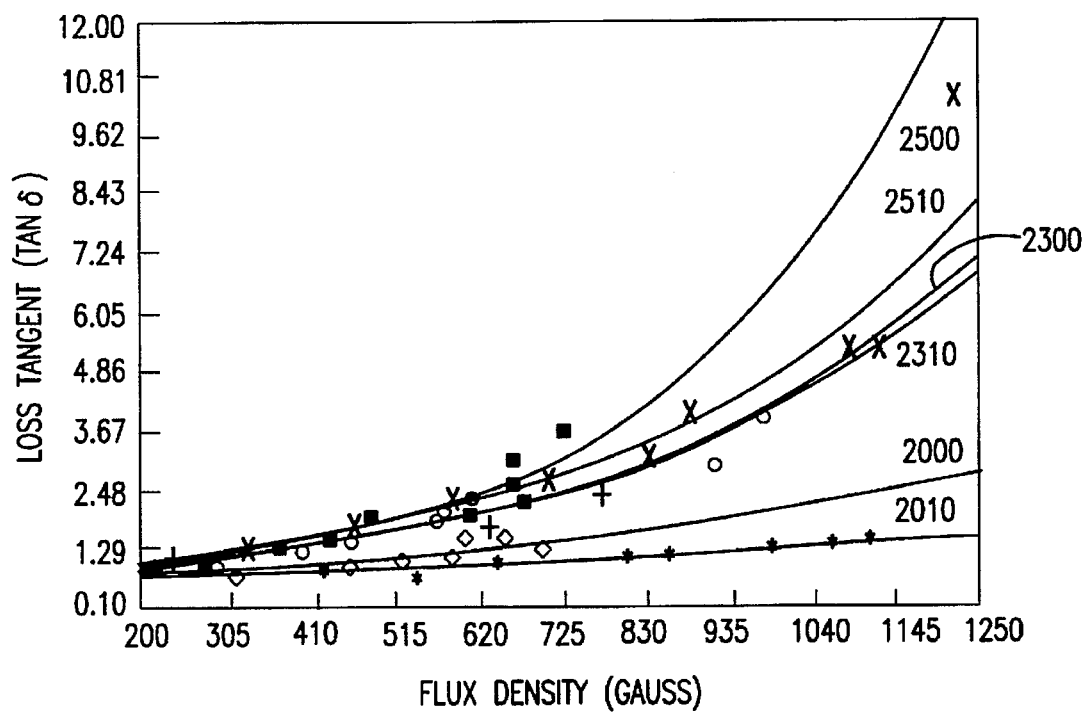

FIG. 18 shows the variation of permeability and loss tangent of manganese ($Mn^{2+}$) substituted ferrites as a function of flux density. Permeability is observed to increase and loss tangent is observed to decrease as a function of manganese concentration as shown in FIG. 18. $Mn^{2+}$ substituted NiZnCo ferrite sample 2010 shows no variation of permeability (56) and loss tangent (0.65) as a function of flux density in the range of 200 to 1250 Gauss. Sample 2010 is accordingly an excellent candidate for power conversion inductors and high frequency transformer applications optimization of the $Mn^{2+}$ concentration results in further improved permeability and reduced loss tangent as shown in FIG. 18. No significant variation of bulk density is observed, whereas Curie temperature is observed to decrease with increase of $Mn^{2+}$ ions for constant $Zn^{2+}$ ions, as shown in Table III.

Thus, according to the methods and compositions of the present invention and as shown in FIGS. 15 through 18, one may obtain a ferrite exhibiting increased permeability and reduced losses at high flux density. For example, one may obtain an improved ferrite material having high permeability and reduced power loss of the formula $Ni_{1-x-y-z}Zn_xCo_yMn_zFe_2O_4$ where x is from about 0.01 to about 0.7, y is from about 0.001 to about 0.25 and z is from about 0 to about 0.2. In particular, where x is 0.1, y is 0.04 and z is 0.1, sintered at 1275° C. in nitrogen for 4 hours, there is no significant dependence of permeability and losses observed upon the flux densities in the broad range of from 200 to 1500 Gauss at 1 MHz excitation frequency.

Lithium (Li+) Substituted NiZnCo Ferrites

Figure 19A:
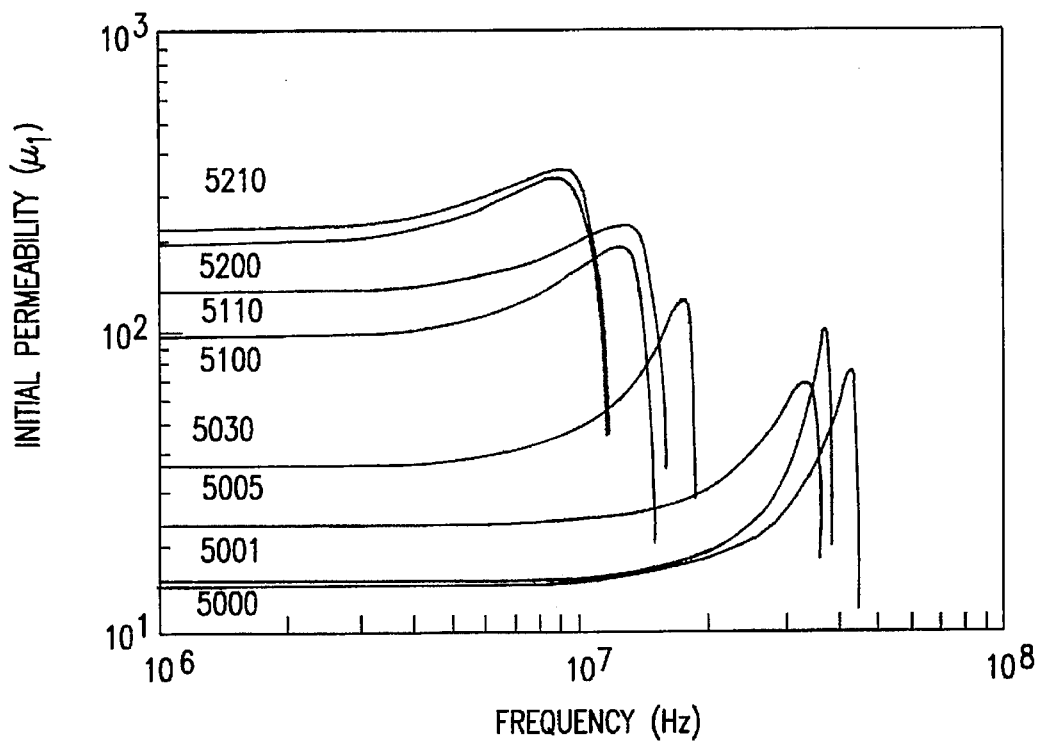
FIG. 19 depicts initial permeability and loss tangent as a function of frequency for NiZnCoLi ferrites.
Figure 19B:
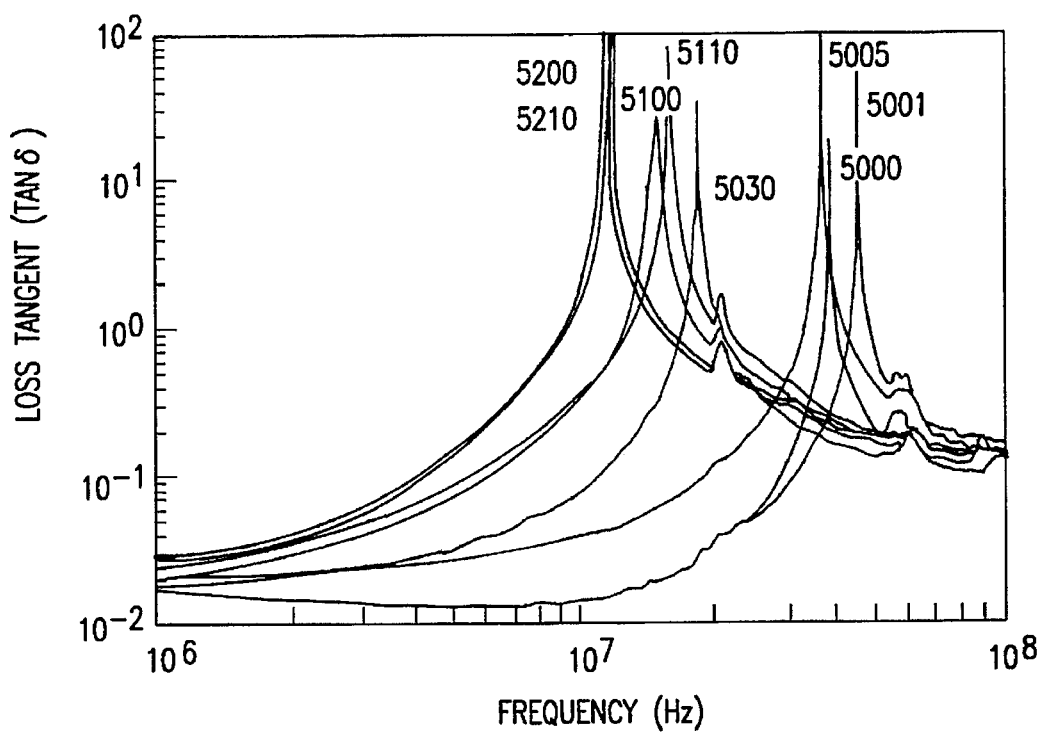
Figure 20A:
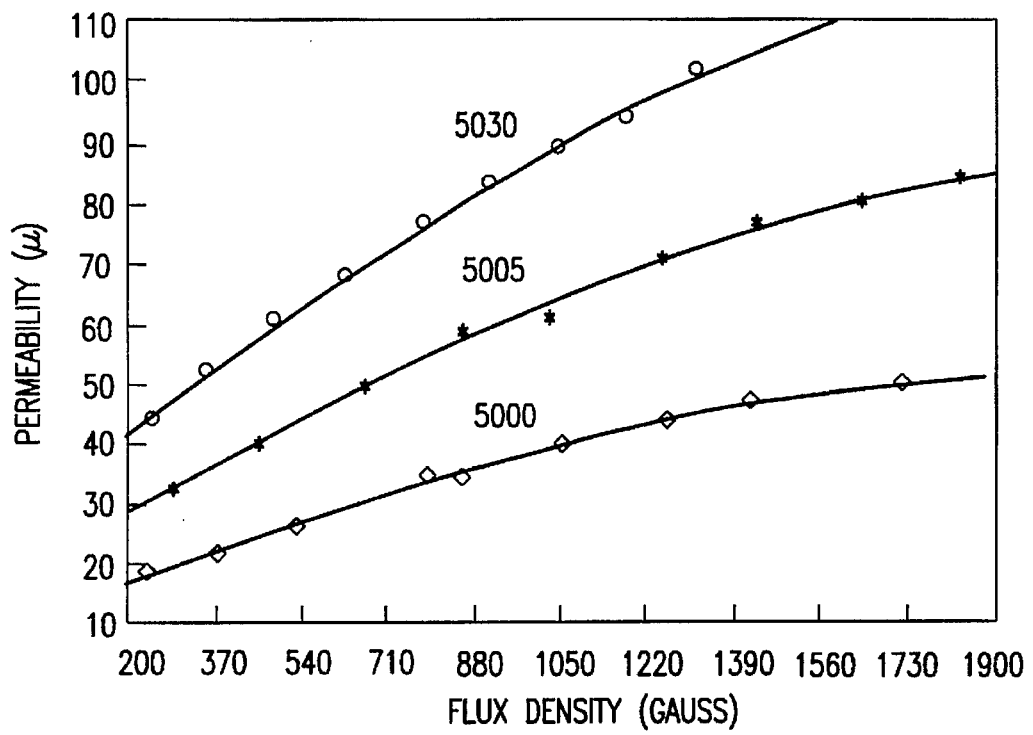
FIGS. 20 and 21 depict permeability and loss tangent as a function of flux density for NiZnCoLi ferrites.
Figure 20B:
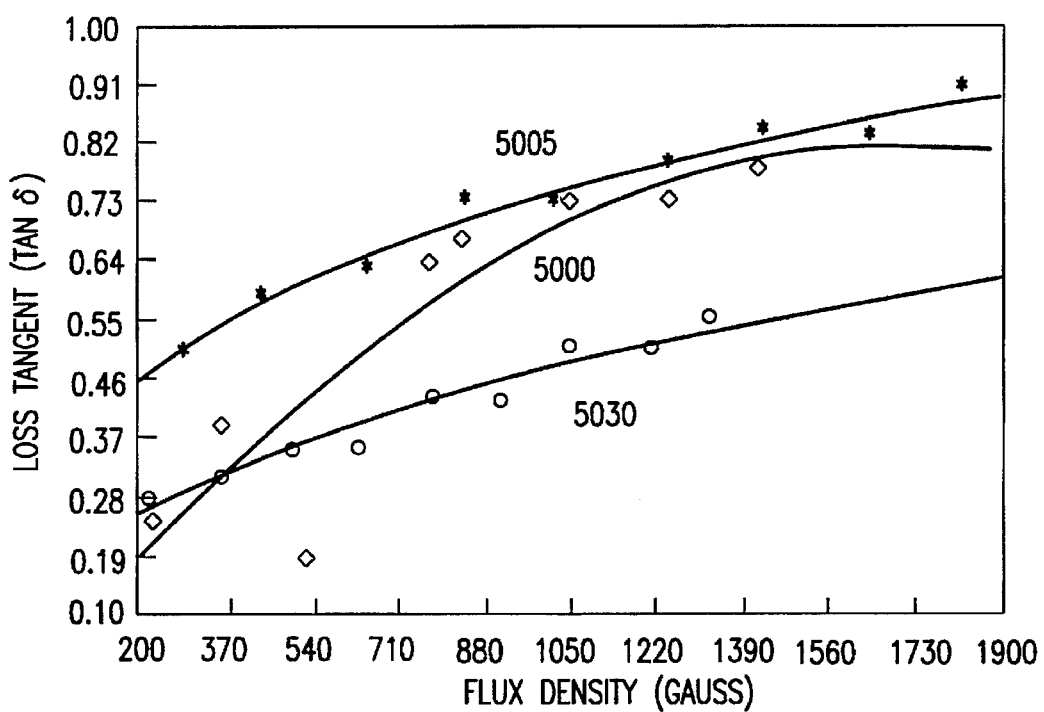
Figure 21A:
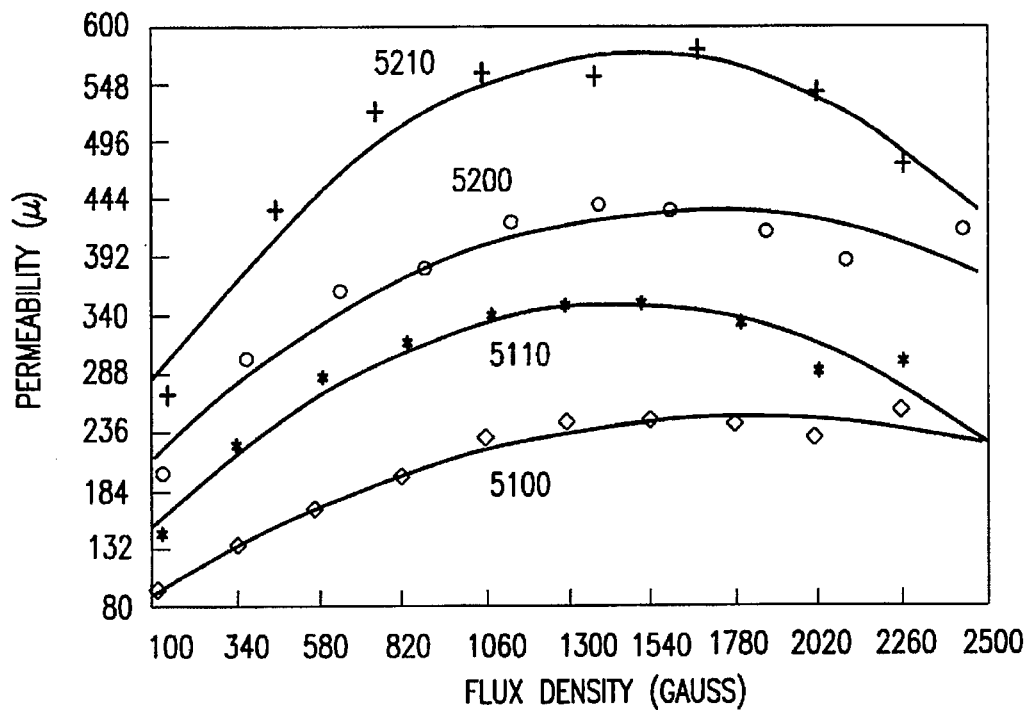
Figure 21B:
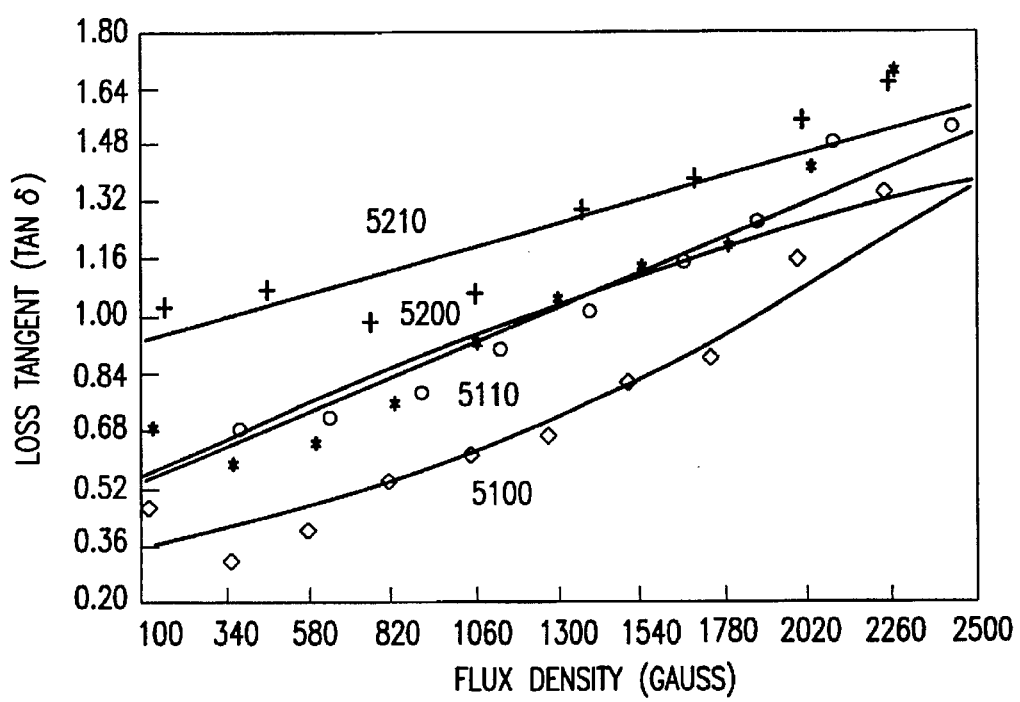

A series of Li substituted NiZnCo ferrites were prepared according to the process described above. Lithium substitutions (Table IV) are observed to increase initial permeability as well as loss tangent as compared to the unaltered ferrite compositions as shown in FIG. 19. FIGS. 20 and 21 show the variation of permeability and loss tangent for lithium substituted ferrites as a function of magnetic flux density. Permeability is observed to increase, whereas loss tangent is observed to be sensitive to the increase of lithium concentration at flux densities ranging from 200 to 2500 Geuss. An increasing trend is observed for both apparent bulk density and Curie temperatures with increasing lithium concentrations for constant zinc concentration as shown in Table IV.

As can be seen from the Figures, a lithium substituted ferrite of the formula $Ni_{1-x-y-z}Zn_xCo_yLi_zFe_2O_4$ may be obtained with a high permeability and reduced power loss density where x is from about 0.3 to about 0.7, y is from about 0.01 to about 0.04 and z is from about 0.01 to about 0.3. A ferrite of low permeability may be obtained where x is from about 0.01 to about 0.3, y is from about 0.01 to about 0.25 and z is from about 0.01 to about 0.3. It is evident from the figures that Li increases initial permeability, but that loss tangent is sensitive to Li concentration as a function of flux density.

Bismuth and Silicon Oxides Additions to NiZnco Ferrites

A series of NiZnCo ferrites having $Bi_2O_3$ and $SiO_2$ additions were prepared according to the methods described above. Such additions are observed to advantageously increase initial permeability, magnetic permeability and reduce loss tangent at high flux densities.

Figure 22A:
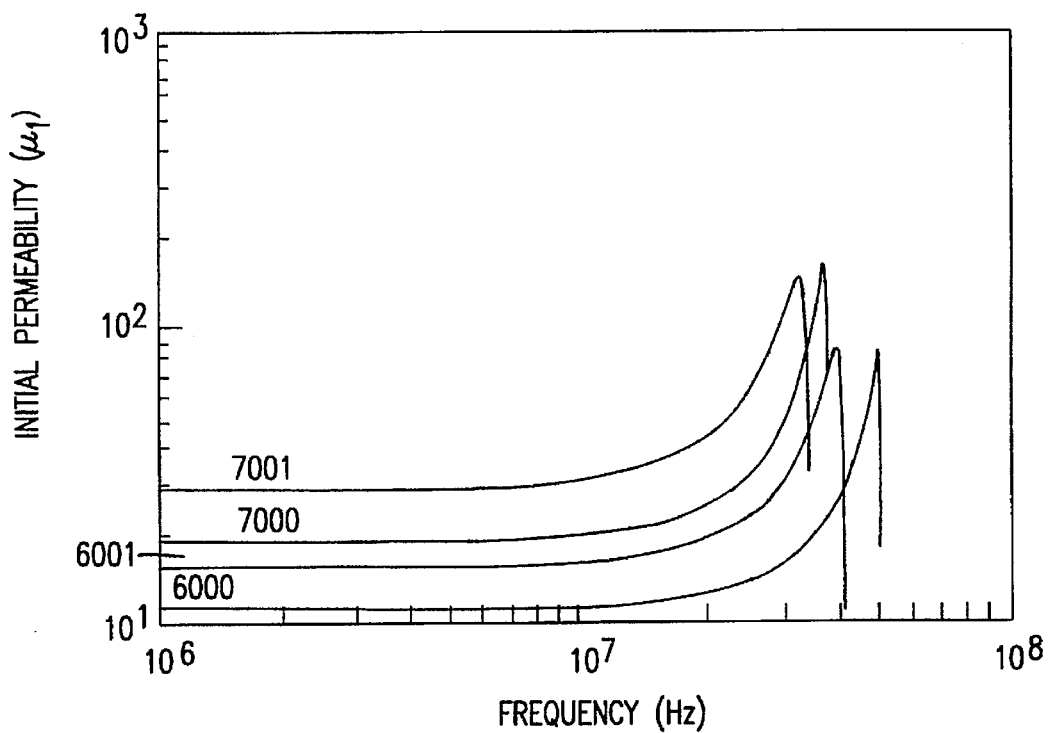
FIG. 22 depicts initial permeability and loss tangent as a function of frequency for NiZnCo ferrites with $Bi_2O_3$ and $SiO_2$ additions.
Figure 22B:
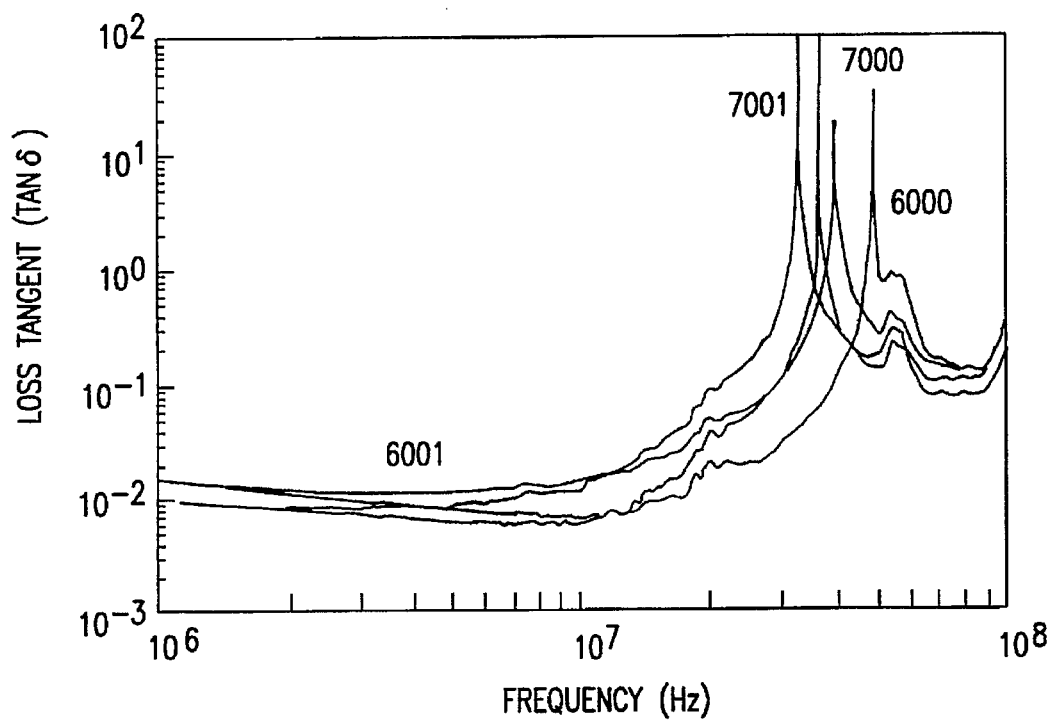
Figure 23A:
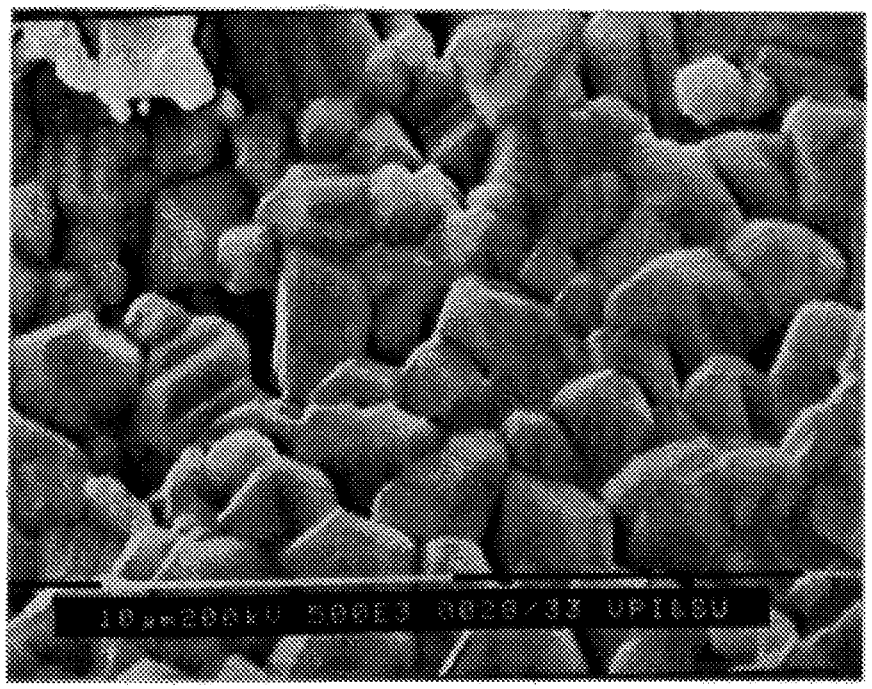
FIG. 23 shows scanning electron secondary images of NiZnCo ferrites with and without $Bi_2O_3$ and $SiO_2$ additions.
Figure 23B:
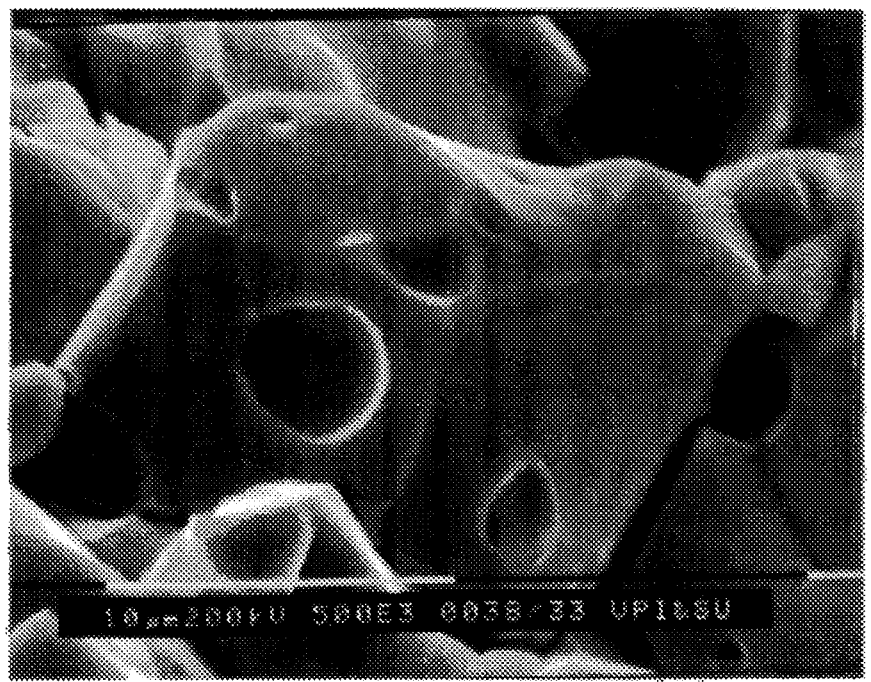
Figure 23C:
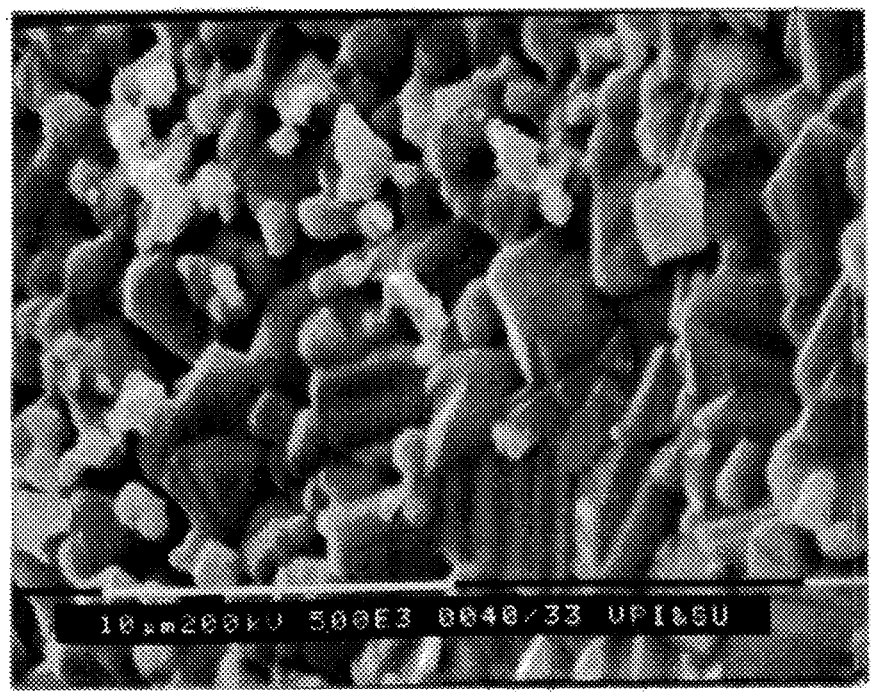
Figure 23D:
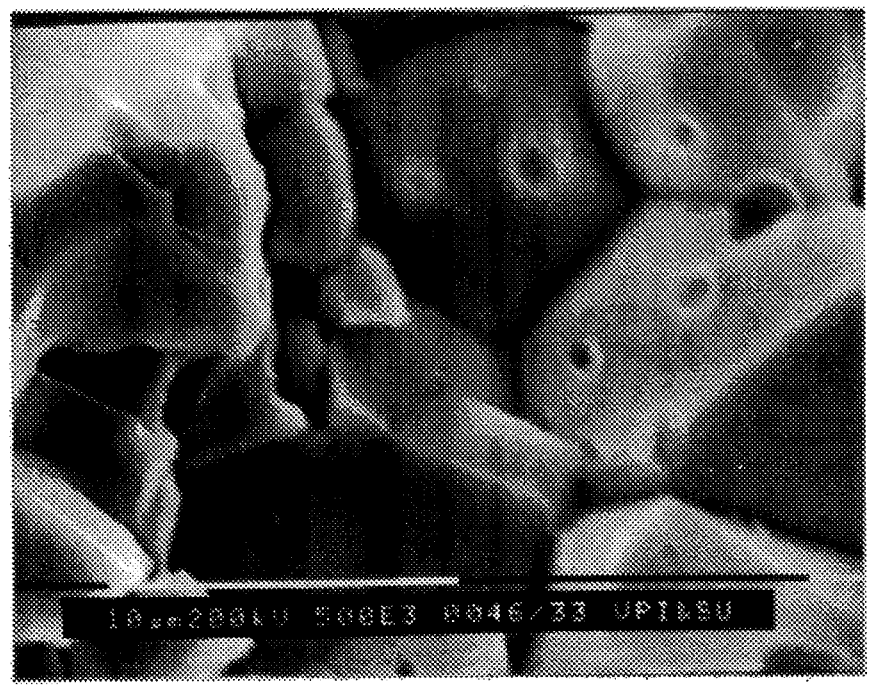

FIG. 22 shows the variation of initial permeability and loss tangent for bismuth oxide ($Bi_2O_3$) and silicon oxide ($SiO_2$) additives (Table V) as compared to nonadditive ferrite samples of the same basic composition. $Bi_2O_3$ and $SiO_2$ increased initial permeability and loss tangent as compared to the nonadditive composition. $Bi_2O_3$ and $SiO_2$ additions promote grain growth by enhancing the liquid phase sintering process, thereby resulting in improved permeability values. The larger grain size of $Bi_2O_3$ and $SiO_2$ additive ferrites as compared to the non-additive ferrites can be readily seen from the scanning electron secondary images of FIG. 23, and the increased apparent bulk density values shown in Table V.

Figure 24A:
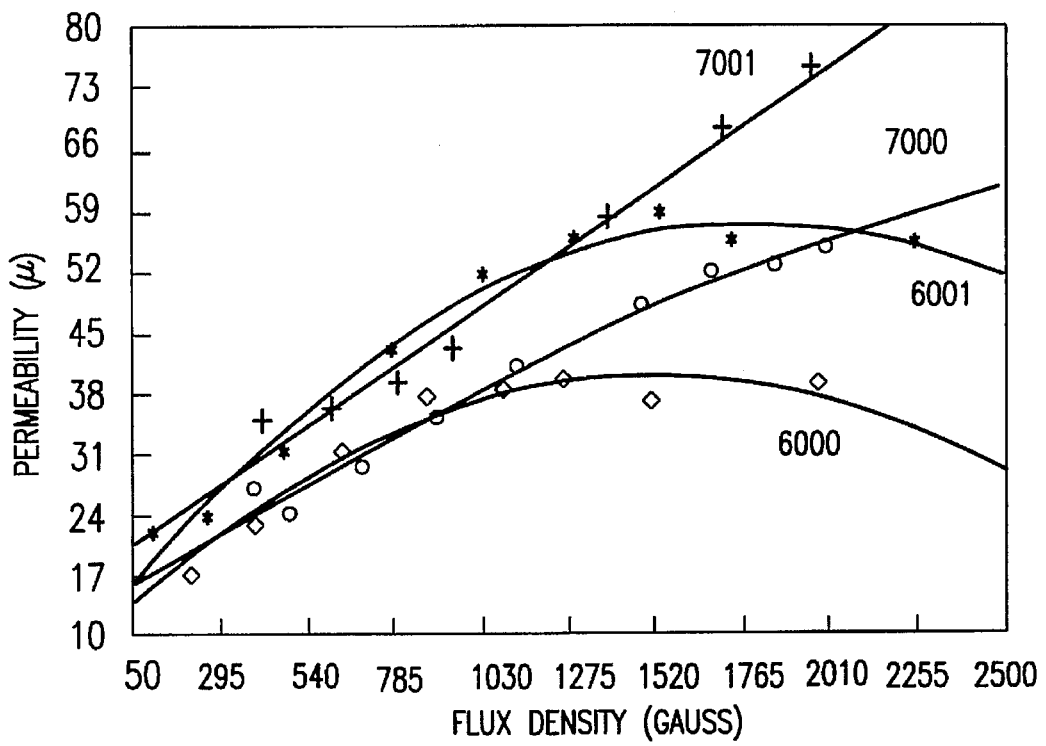
FIG. 24 depicts permeability and loss tangent as a function of flux density for NiZnCo ferrites with $Bi_2O_3$ and $SiO_2$ additions.
Figure 24B:
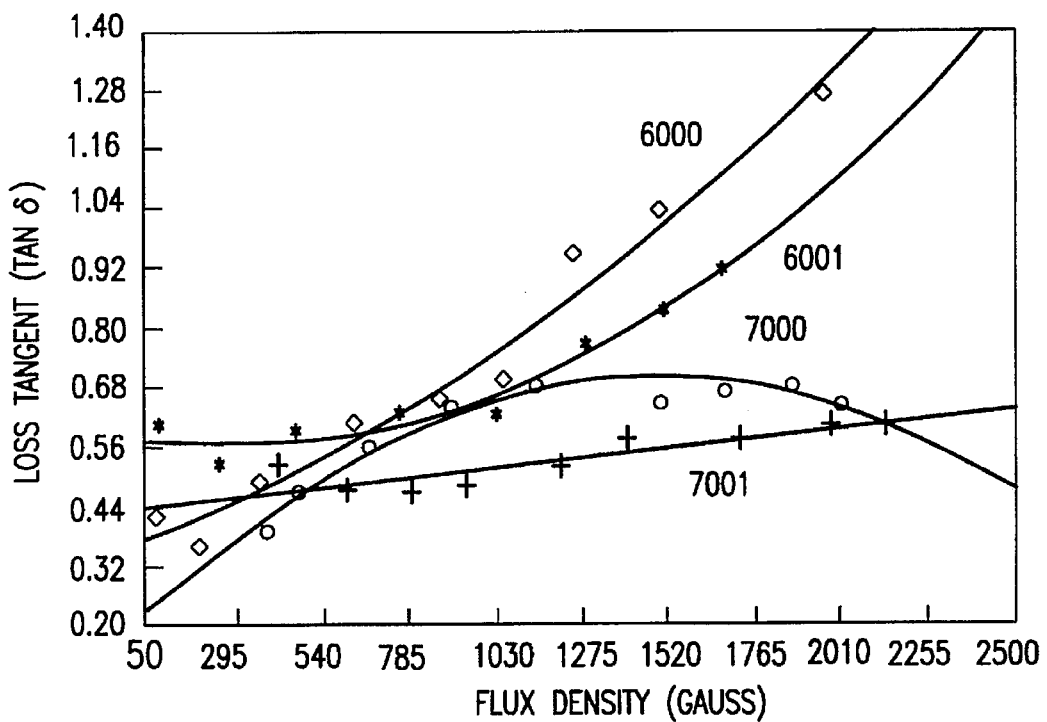

FIG. 24 shows the variation of permeability and loss tangent for bismuth oxide and silicon oxide additions to NiZnCo ferrites as a function of flux density. Permeability is observed to increase, whereas loss tangent is observed to decrease in the additive samples. Both permeability and loss tangent are observed to increase as a function of flux density. As the figures show, additions of $Bi_2O_3$ and $SiO_2$ are effective in increasing permeability without increasing loss tangent of ferrite materials in the 50–2500 Gauss flux density range.

Thus, bismuth oxide and silicon oxide additions to nickel-zinc-cobalt ferrites of the formula $Ni_{1-x-y}Zn_xCo_yFe_2O_4$ may be obtained with high permeability and reduced power losses where x is in the range from about 0.3 to about 0.7 and y is in the range from about 0.001 to about 0.4. Similarly, an improved ferrite may be obtained having low losses and low permeability where x is in the range from about 0.01 to about 0.3 and y is in the range from about 0.04 to about 0.25. For example, for x=0.1, y=0.04, 1.0 weight percent: bismuth oxide and 0.5 weight percent silicon oxide sintered at 1150° C. in oxygen for 4 hours and cooled at 100° C. per hour one may obtain an improved ferrite with a permeability of 24 and a power loss density of 4.25 Watts/cm$^3$ at 2 MHz in a flux density of 200 Gauss. It is now evident that $Bi_2O_3$ and $SiO_2$ additions to NiZnCo ferrites are particularly advantageous at high flux density.

The products and methods of the present invention overcome the problems inherent in use of prior art ferrites in high frequency applications, exhibit advantageous magnetic properties as compared to the prior art ferrites and, furthermore, provide for production of improved ferrites having properties matching the desired operating characteristics of the electronic system, particularly with respect to system efficiency and the properties of dispersion frequency, permeability, power loss and Curie temperature, one or more of which properties may be critical to a particular high frequency application.

The foregoing discussion has focused on ionic substitution of NiZnCo ferrites using Cr, Mn or Li ions. Other ionic species, however, may also be used for substitution purposes without deviating from the scope or intent of the present invention. Enhanced magnetic properties, of the sort described herein, may also be obtained with the present invention vis-a-vis substitution of Cu, V, Nb, or Zr ions. These additional ions may be substituted into NiZn or NiZnCo ferrites to enhance magnetic properties to obtain optimum performance for a particular operating environment.

It will be apparent to those skilled in the art that various modifications can be made to the processes and products of the present invention. Thus, it is intended that the present invention covers such modifications and variations of this invention provided they come within the scope of the appended claims and their equivalents.

We claim:

1. An improved transformer or inductor ferrimagnetic core material for megahertz frequency high flux density applications, said ferrimagnetic core material consisting essentially of a compound of the formula $RFe_2O_4$ where R is $Ni_{1-x-y-z}Zn_xCo_yCr_z$, said core material being further characterized in that x is in the range of from about 0.01 to about 0.7, y is in the range of from about 0.001 to about 0.25 and z is in the range of from about 0.01 to about 0.4.

2. The ferrimagnetic core material of claim 1, where x is in the range of from about 0.3 to about 0.7, y is in the range of from about 0.001 to about 0.25 and z is in the range of from about 0.1 to about 0.4.

3. The ferrimagnetic core material of 1, where x is in the range of from about 0.01 to about 0.3, y is in the range of from about 0.001 to about 0.25 and z is in the range of from about 0.01 to about 0.4.

4. The ferrimagnetic core material of claim 2, where x is about 0.5, y is about 0.04 and z is about 0.15.

5. An improved transformer or inductor ferrimagnetic core material defined by the formula $RFe_2O_4$ where R is $Ni_{1-x-y-z}Zn_xCo_yCr_z$, said core material being further characterized in that x is in the range of from about 0.01 to about 0.7, y is in the range of from about 0.001 to about 0.25 and z is in the range of from about 0.01 to about 0.4, said core material being made by a method comprising the following steps:

A. preparing a powdered mixture containing Ni, Zn, Co, Cr and Fe in sufficient amounts to produce said core material;

B. preforming said powdered mixture into a usable shape;

C. sintering the preformed mixture in an atmosphere of $O_2$ at a temperature between about 1050° C. and about 1350° C. for between about 0.5 and about 24 hours; and D. cooling said sintered material at a rate of about 100° C. per hour.

6. The ferrimagnetic core material of claim 5, where said sintering is performed at about 1250° C. for about 0.5 hours.

7. The ferrimagnetic core material of claim 5, where said sintering is performed at about 1150° C. for about 4 hours.

8. The ferrimagnetic core material of claim 6 or 7, where x is in the range of from about 0.3 to about 0.7, y is in the range of from about 0.001 to about 0.25 and z is in the range of from about 0.1 to about 0.2.

9. The ferrimagnetic core material of claim 8, where x is about 0.5, y is about 0.04 and z is about 0.15.

10. A method of making an improved ferrimagnetic core material defined by the formula $RFe_2O_4$ where R is $Ni_{1-x-y-z}Zn_xCo_yCr_z$ where x is in the range of from about 0.01 to about 0.7, y is in the range of from about 0.001 to about 0.25 and z is in the range of from about 0.01 to about 0.40, comprising the following steps:

A. preparing a powdered mixture containing Ni, Zn, Co, Cr and Fe in sufficient amounts to produce said core material;

B. preforming said powdered mixture into a usable shape;

C. sintering the preformed mixture in an $O_2$ atmosphere at a temperature between about 1050° to about 1350° C. for between about 0.5 and about 24 hours; and D. cooling said sintered material at about 100° C. per hour.

11. The method of claim 10, where said sintering is performed at about 1250° C. for about 0.5 hours.

12. The method of claim 10, where said sintering is performed at about 1150° C. for about 4 hours.

13. The method of claims 11 or 12, where x is in the range of from about 0.3 to about 0.7, y is in the range of from about 0.001 to about 0.25 and z is in the range of from about 0.1 to about 0.2.

14. The method of claim 13, where x is about 0.5, y is about 0.04 and z is about 0.15.

* * * * *